(12) United States Patent
Kim et al.

(10) Patent No.: US 9,836,670 B2
(45) Date of Patent: Dec. 5, 2017

(54) IMAGE PROCESSING DEVICE FOR COMPUTING AN INITIAL PHASE HAVING MAGNITUDE AND DIRECTION BASED ON IMAGE PROCESSING INFORMATION

(71) Applicant: SAMSUNG ELECTRONICS CO., LTD., Suwon-si, Gyeonggi-Do (KR)

(72) Inventors: Seong Woon Kim, Suwon-si (KR); Sung Chul Yoon, Hwaseong-si (KR); Ha Na Yang, Gunpo-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/057,784

(22) Filed: Mar. 1, 2016

(65) Prior Publication Data
US 2016/0260221 A1   Sep. 8, 2016

(30) Foreign Application Priority Data

Mar. 3, 2015 (KR) .................. 10-2015-0029874

(51) Int. Cl.
| | | |
|---|---|---|
| G06K 9/32 | (2006.01) | |
| G06K 9/62 | (2006.01) | |
| G06T 3/60 | (2006.01) | |
| G06T 3/40 | (2006.01) | |

(52) U.S. Cl.
CPC .............. G06K 9/6215 (2013.01); G06T 3/40 (2013.01); G06T 3/60 (2013.01)

(58) Field of Classification Search
USPC ....... 382/295, 298, 291, 162, 270, 261, 278, 382/274, 299, 255, 300; 345/204, 561, 345/660, 690; 348/208.1, 222.1, 208.2, 348/208.3, 246, 448, 452, 699; 358/1.9, 358/3.26, 3.27, 466, 447
See application file for complete search history.

(56) References Cited

U.S. PATENT DOCUMENTS

| | | | |
|---|---|---|---|
| 6,608,935 B2 | 8/2003 | Nagumo et al. | |
| 6,891,968 B2 * | 5/2005 | Janardhanan ............ | G09G 5/28 382/162 |
| 7,305,034 B2 | 12/2007 | Srinivasan | |
| 7,639,742 B2 | 12/2009 | Sato et al. | |
| 7,881,553 B2 * | 2/2011 | Ishii ........................ | G06K 9/38 358/466 |
| 8,054,886 B2 | 11/2011 | Srinivasan et al. | |
| 8,175,168 B2 | 5/2012 | Sun | |

(Continued)

FOREIGN PATENT DOCUMENTS

JP       2013-048307       3/2013

*Primary Examiner* — Anh H Do
(74) *Attorney, Agent, or Firm* — F. Chau & Associates, LLC

(57) ABSTRACT

A image processing method includes computing an initial phase corresponding to a difference between a position of a first pixel of an input image and a position of a first pixel of an output image using at least one of scaling ratio information between the input and output images, chroma subsampling format conversion information applied between the input and output images, or rotation angle information of the input image, and determining the position of the first pixel of the output image based on the initial phase and the position of the first pixel of the input image.

17 Claims, 70 Drawing Sheets

(56) References Cited

U.S. PATENT DOCUMENTS

| | | | |
|---|---|---|---|
| 8,718,133 B2* | 5/2014 | Lee | H04N 19/86 375/240.02 |
| 8,780,272 B2 | 7/2014 | Sullivan | |
| 8,792,009 B2* | 7/2014 | Oota | H04N 5/144 348/208.1 |
| 2013/0182780 A1 | 7/2013 | Alshin et al. | |
| 2014/0037015 A1 | 2/2014 | Ye et al. | |
| 2014/0044161 A1 | 2/2014 | Chen et al. | |
| 2014/0078393 A1 | 3/2014 | Li et al. | |

* cited by examiner

S : Source width

D : Destination width

Initial Phase = $\frac{1}{2D} - \frac{1}{2S}$

Normalized to $\frac{1}{S}$,

Initial Phase = $\frac{S-D}{2D}$ (After Normalization)

YUV420 for H.261, H263, and MPEG-1

YUV420 for MPEG-2

YUV422

YUV444

○ Y Sample(=Luma Sample)
✕ C Sample(=Chroma Sample)

IMAGE PROCESSING DEVICE FOR COMPUTING AN INITIAL PHASE HAVING MAGNITUDE AND DIRECTION BASED ON IMAGE PROCESSING INFORMATION

CROSS-REFERENCE TO RELATED APPLICATION

This application claims priority under 35 U.S.C. §119 to Korean Patent Application No. 10-2015-0029874, filed on Mar. 3, 2015, in the Korean intellectual Property Office, the disclosure of which is incorporated by reference herein in its entirety.

TECHNICAL FIELD

Exemplary embodiments of the present inventive concept relate to an image processing device, and more particularly, to an image processing device for computing an initial phase according to an image processing mode.

DISCUSSION OF THE RELATED ART

An image processing device receives an input image and performs image processing (e.g., image scaling, rotation, or format conversion) on the input images to generate an output image. A position of a first pixel of the output image may be changed to be different from a position of a first pixel of the input image due to the image processing of the image scaling, the format conversion, or the rotation on the input image. If the changed position of the first pixel of the output image is not perfectly corrected, the output image will be distorted.

SUMMARY

According to an exemplary embodiment of the present inventive concept, an image processing method using an image processing device is provided. The method includes computing an initial phase corresponding to a difference between a position of a first pixel of an input image and a position of a first pixel of an output image using at least one of scaling ratio information between the input and output images, chroma subsampling format conversion information applied between the input and output images, or rotation angle information of the input image, and determining the position of the first pixel of the output image based on the initial phase and the position of the first pixel of the input image.

The method may further include generating pixels of the output image based on the position of the first pixel of the output image and pixels of the input image.

The computing the initial phase may include computing an initial phase of a first luma sample of the output image using the scaling ratio information and computing an initial phase of a first chroma sample of the output image using the at least one of the scaling ratio information, the chroma subsampling format conversion information, or the rotation angle information.

A format of the input image may correspond to YUV444, and a format of the output image may correspond to YUV422 or YUV420.

A format of the input image may correspond to YUV422 or YUV420, and a format of the output image may correspond to YUV444.

A format of the input image may be one of YUV422 and YUV420, and a format of the output image may be another one of YUV422 and YUV420.

The image processing device may be a central processing unit or a multimedia processing circuit included in a system on chip.

According to an exemplary embodiment of the present inventive concept, a system on chip is provided. The system on chip may include a central processing unit and a multimedia processing circuit. The central processing unit may be configured to compute an initial phase corresponding to a difference between a position of a first pixel of an input image and a position of a first pixel of an output image using at least one of scaling ratio information between the input and output images, chroma subsampling format conversion information applied between the input and output images, or rotation angle information of the input image. The multimedia processing circuit may be configured to be connected to the central processing unit, to receive the initial phase and the input image, and to determine the position of the first pixel of the output image based on the initial phase and the position of the first pixel of the input image.

The central processing unit may compute an initial phase of a first luma sample of the output image using the scaling ratio information.

The central processing unit may compute an initial phase of a first chroma sample of the output image using the at least one of the scaling ratio information, the chroma subsampling format conversion information, or the rotation angle information.

The multimedia processing circuit may include a scaler configured to scale up or down the input image based on the scaling ratio information to generate the scaled up or down input image as the output image.

The multimedia processing circuit may include a chroma subsampling converter configured to convert a format of the input image based on the chroma subsampling format conversion information and generate the output image in a converted format.

The multimedia processing circuit may include a rotator configured to rotate the input image based on the rotation angle information to generate the rotated input image as the output image.

The multimedia processing circuit may generate pixels of the output image based on the position of the first pixel of the output image and pixels of the input image.

According to an exemplary embodiment of the present inventive concept, an image processing device is provided. The image processing device includes at least one of a rotator, a scaler, and a chroma subsampling converter. The rotator rotates an input image input to the image processing device based on rotation angle information. The scaler scales up or down the input image based on scaling ratio information. The chroma subsampling converter converts a first format of the input image to a second format based on chroma subsampling format conversion information. The image processing device computes an initial phase corresponding to a difference between a position of a first pixel of the input image and a position of a first pixel of an output image output from the image processing device based on at least one of the rotation angle information, the scaling ratio information, or the chroma subsampling format conversion information.

The image processing device may determine the position of the first pixel of the output image based on the initial phase and the position of the first pixel of the input image.

The image processing device may generate pixels of the output image based on the position of the first pixel of the output image and pixels of the input image.

The image processing device may compute an initial phase of a first luma sample of the output image using the scaling ratio information.

The image processing device may compute an initial phase of a first chroma sample of the output image using the at least one of the scaling ratio information, the chroma subsampling format conversion information, or the rotation angle information.

BRIEF DESCRIPTION OF THE DRAWINGS

The above and other features of the present inventive concept will become more apparent by describing in detail exemplary embodiments thereof with reference to the attached drawings in which.

DETAILED DESCRIPTION OF THE EMBODIMENTS

Figure 1A:
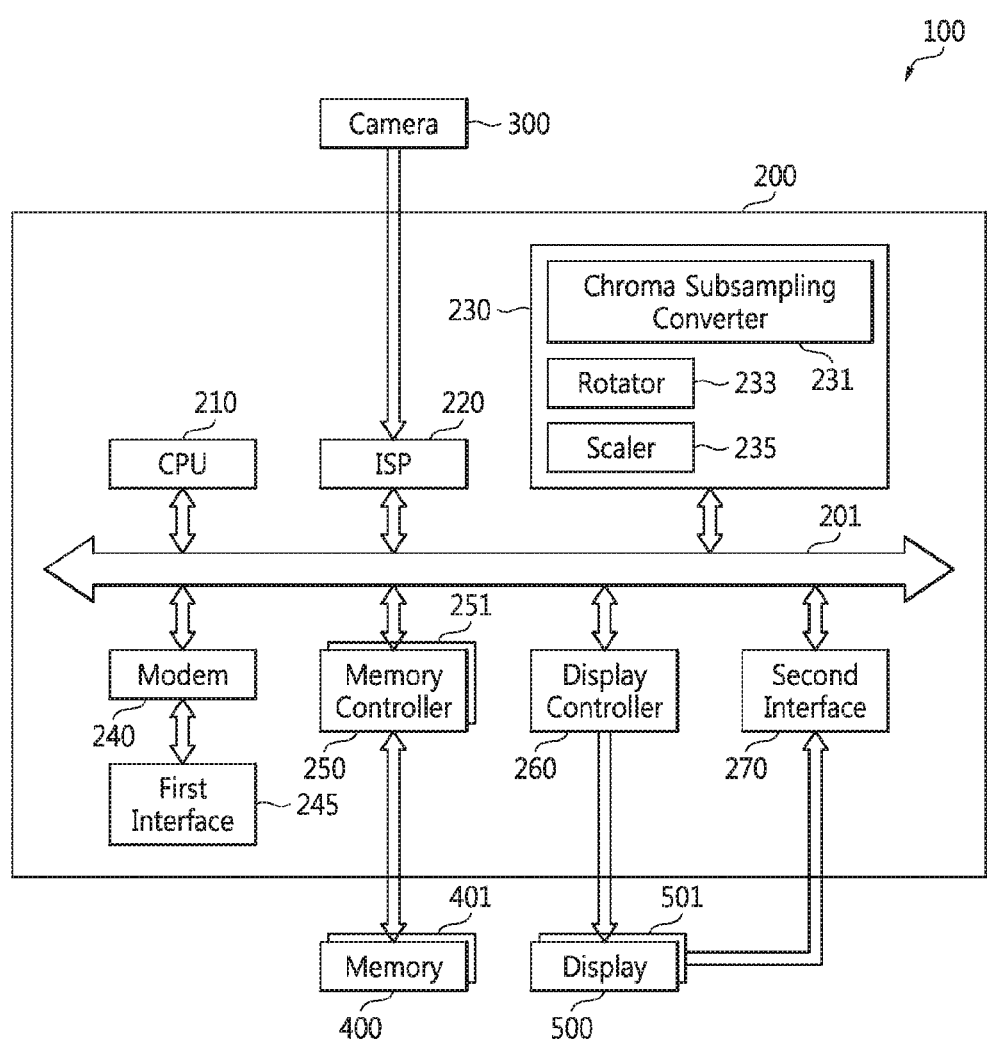
FIG. 1A is a block diagram of a data processing system according to an exemplary embodiment of the present inventive concept.

The present inventive concept now will be described more fully hereinafter with reference to the accompanying drawings, in which embodiments of the invention are shown. The present inventive concept may, however, be embodied in many different forms without departing from the spirit and scope of the present inventive concept and should not be construed as limited to the embodiments set forth herein. In the drawings, the size and relative sizes of layers and regions may be exaggerated for clarity. Like numbers may refer to like elements throughout the specification and drawings.

As used herein, the term "and/or" includes any and all combinations of one or more of the associated listed items and may be abbreviated as "/".

As used herein, the singular forms "a", "an" and "the" are intended to include the plural forms as well, unless the context clearly indicates otherwise.

Hereinafter, the term "initial phase" may be a difference between the position of a first pixel of an input image and the position of a first pixel of an output image, and may be a vector having a magnitude and a direction. The initial phase may be used to compensate for a sampling position error of the output image. The input image may be an image input to an image processing circuit (e.g., a central processing unit or a multimedia processing circuit 230 of FIG. 1A), and the output image may be an image output from the image processing circuit.

Factors that determine the initial phase may include at least one of a scaling ratio between the input and output images, a chroma subsampling method used to the input or output image, and a rotation angle of the input image. A rotation of the input image to generate the output image may include a flip of the input image. A pixel may refer to a pixel sample. A pixel may include a luma sample and a chroma sample. The luma sample may refer to a luma component and the chroma sample may refer to a chroma component. The chroma sample may include a blue-difference chroma component Cb and a red-difference chroma component Cr.

A luma pixel may be a pixel having a luma value, and a chroma pixel may be a pixel having a chroma value. In an exemplary embodiment, a pixel may have a luma value and a chroma value.

FIG. 1A is a block diagram of a data processing system 100 according to an exemplary embodiment of the present inventive concept. Referring to FIG. 1A, the data processing system 100 may include a controller 200, a camera 300, at least one memory 400 and/or 401, and a display 500. The data processing system 100 may include a touch screen 501.

The data processing system 100 may be implemented as a personal computer (PC), a mobile computing device, or the like. The mobile computing device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device, a portable navigation device (PND), a handheld game console, a mobile internet device (MID), a wearable computer, an internet of things (IoT) device, an internet of everything (IoE) device, an e-book, or the like.

The controller 200 may control the operations of the camera 300, the at least one memory 400 and/or 401, and the display 500. When the data processing system 100 includes the touch screen 501, the controller 200 may control the operation of the touch screen 501.

The controller 200 may be implemented as an integrated circuit (IC), a motherboard, a system on chip (SoC), an application processor (AP), a mobile AP, or the like. The controller 200 may include bus architecture 201, a central processing unit (CPU) 210, an image signal processor (ISP) 220, a multimedia processing circuit 230, at least one memory controller 250 and/or 251, and a display controller 260. The controller 200 may include a modem 240, a first interface 245, and a second interface 270. Although the modem 240 is implemented within the controller 200 in the embodiment illustrated in FIG. 1A, the modem 240 may be implemented outside the controller 200 in an exemplary embodiment.

The bus architecture 201 may be implemented as advanced microcontroller bus architecture (AMBA), an advanced high-performance bus (AHB), an advanced peripheral bus (APB), an advanced extensible interface (AXI), an advanced system bus (ASB), or a combination thereof, but the present inventive concept is not restricted to these examples. The CPU 210 may control the ISP 220, the multimedia processing circuit 230, the at least one memory controller 250 and/or 251, and/or the display controller 260 through the bus architecture 201. The CPU 210 may control the modem 240, the first interface 245, and the second interface 270 through the bus architecture 201.

The CPU 210 may compute an initial phase having a magnitude and a direction based on a size of an input image and a size of an output image, and may transmit a computation result to the multimedia processing circuit 230. The multimedia processing circuit 230 may receive the initial phase and the input image, and may determine a position of a first pixel of an output image based on the initial phase and a position of a first pixel of the input image. The multimedia processing circuit 230 may generate the output image including output pixels based on the position of the first pixel of the output image and input pixels included in the input image.

The ISP 220 may control (or perform) image format conversion, noise reduction, and image enhancement for image data output from the camera 300. For example, the ISP 220 may convert first data in a first format output from the camera 300 into second data in a second format. The first format may be a Bayer format, and the second format may be an RGB format or a YUV format. The camera 300 may include a complementary metal oxide semiconductor (CMOS) image sensor chip.

Although the ISP 220 is implemented within the controller 200 in the embodiment illustrated in FIG. 1A, the ISP 220 may be implemented in an independent chip disposed between the controller 200 and the camera 300. In an exemplary embodiment, the ISP 220 may be implemented within the camera 300 and the CMOS image sensor chip included in the camera 300 and the ISP 220 may be packaged into a single package. The controller 200 or the CPU 210 may be a processor.

The multimedia processing circuit 230 may generate an output image including output pixels based on an initial phase and input pixels included in an input image. The input pixels may include a luma pixel and a chroma pixel. The output pixels may include a luma pixel and a chroma pixel. The number of input pixels may be the same as the number of output pixels. In an exemplary embodiment, the number of input pixels may be different from the number of output pixels.

Figure 1B:
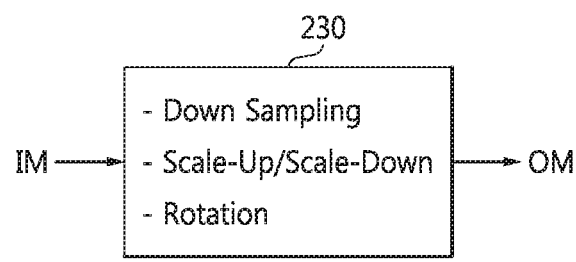
FIG. 1B is a diagram showing operations of a multimedia processing circuit illustrated in FIG. 1A according to an exemplary embodiment of the present inventive concept.

FIG. 1B is a diagram showing operations of a multimedia processing circuit 230 illustrated in FIG. 1A according to an exemplary embodiment of the present inventive concept. Referring to FIGS. 1A and 1B, the multimedia processing circuit 230 may perform at least one operation among down sampling, scaling up or down, and rotation on an input image IM, and may output an output image OM as the operation result.

The format of the input image IM may be YUV444, and the format of the output image OM may be YUV420 or YUV422. In an exemplary embodiment of the present inventive concept, the format of the input image IM may be YUV422, and the format of the output image OM may be YUV420.

Figure 1C:
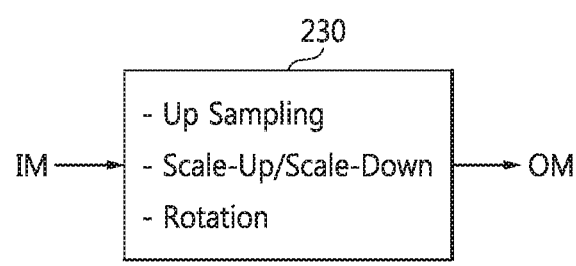
FIG. 1C is a diagram showing the operations of the multimedia processing circuit illustrated in FIG. 1A according to an exemplary embodiment of the present inventive concept.

FIG. 1C is a diagram showing the operations of the multimedia processing circuit 230 illustrated in FIG. 1A according to an exemplary embodiment of the present inventive concept. Referring to FIGS. 1A and 1C, the multimedia processing circuit 230 may perform at least one operation among up sampling, scaling up or down, and rotation on the input image IM, and may output the output image OM as the operation result.

The format of the input image IM may be YUV420 or YUV422, and the format of the output image OM may be YUV444. In an exemplary embodiment of the present inventive concept, the format of the input image IM may be YUV420, and the format of the output image OM may be YUV422.

Here, YUV420 may collectively be referred to as YUV420 formats for H.261, H.263, MPEG-1, MPEG-2, or the like. In an exemplary embodiment of the present inventive concept, an image in an RGB format may be used instead of an image in a YUV444 format. The RGB format may be processed in the same manner as a luma sample in the YUV444 format.

Referring back to FIG. 1A, the multimedia processing circuit 230 may include at least one among a chroma subsampling converter 231, a rotator 233, and a scaler 235. An image input to the multimedia processing circuit 230 may be referred to as an input image or a source image, and an image output from the multimedia processing circuit 230 may be referred to as an output image or a destination image.

The chroma subsampling converter 231 may convert a format of an input image based on chroma subsampling format conversion information and may output an output image in a converted format. The rotator 233 may rotate an input image based on rotation angle information and may generate a rotated output image. The scaler 235 may scale up or down an input image based on scaling information and may generate a scaled-up or scaled-down output image. An image processed by the rotator 233 may be input to the scaler 235 or the chroma subsampling converter 231. Connection among the chroma subsampling converter 231, the rotator 233, and the scaler 235 may vary according to an embodiment of the present inventive concept.

The at least one memory controller 250 and/or 251 may write image data received from the camera 300 or the modem 240 to the at least one memory 400 and/or 401. The at least one memory controller 250 and/or 251 may read image data from the at least one memory 400 and/or 401 and may transmit the read data to the multimedia processing circuit 230 or the display controller 260.

The multimedia processing circuit 230 may be a codec, and may include an encoder and a decoder. The encoder may function as a compressor and the decoder may function as a decompressor. The encoder may encode image data to be stored in the at least one memory 400 and/or 401, and the decoder may decode image data output from the at least one memory 400 and/or 401.

For example, the at least one memory controller 250 and/or 251 may control data access operations on the at least one memory 400 and/or 401 according to the control of the CPU 210. The data access operations may include an operation of writing data to the memory 400 or 401 and an operation of reading data from the memory 400 or 401.

The at least one memory 400 and/or 401 may include volatile memory and/or non-volatile memory. The volatile memory may be random access memory (RAM), dynamic RAM (DRAM), static RAM (SRAM), buffer memory, or the like. The non-volatile memory may be flash memory, magnetic RAM (MRAM), spin-transfer torque MRAM, ferroelectric RAM (FeRAM), phase-change RAM (PRAM), resistive RAM (RRAM), or the like. The flash memory may be NAND-type or NOR-type flash memory that stores at least one bit.

For example, the memory 400 may be formed of DRAM and the memory 401 may be formed of flash-based memory. At this time, the memory controller 250 may be implemented as a DRAM controller and the memory controller 251 may be implemented as a flash-based memory controller. The flash-based memory may be implemented as a solid-state drive or solid-state disk (SSD), a multimedia card (MMC), an embedded MMC (eMMC), a universal serial bus (USB) flash drive, a universal flash storage (UFS), or the like.

The display controller 260 may transmit image data output from the CPU 210, the multimedia processing circuit 230, or the display controller 260 to the display 500 according to the control of the CPU 210. The modem 240 may receive image data from an external device through the first interface 245. The first interface 245 may be a radio transceiver.

The camera 300 may include a CMOS image sensor chip. The CMOS image sensor chip may output image data corresponding to an optical image of an object to the ISP 220. The camera 300 may output the image data to the ISP 220 using mobile industry processor interface (MIPI) camera serial interface (CSI).

The display 500 may display image data output from the display controller 260. The touch screen 501 may be used to select or activate a graphics user interface (GUI) displayed on the display 500. For example, the touch screen 501 may generate a user touch input for controlling the operation of the controller 200 and may transmit the user touch input to the second interface 270. The second interface 270 may transmit the user touch input to the CPU 210 through the bus architecture 201. The GUI may be displayed on the display 500 according to the control of an application program executed by the CPU 210.

Figure 2:
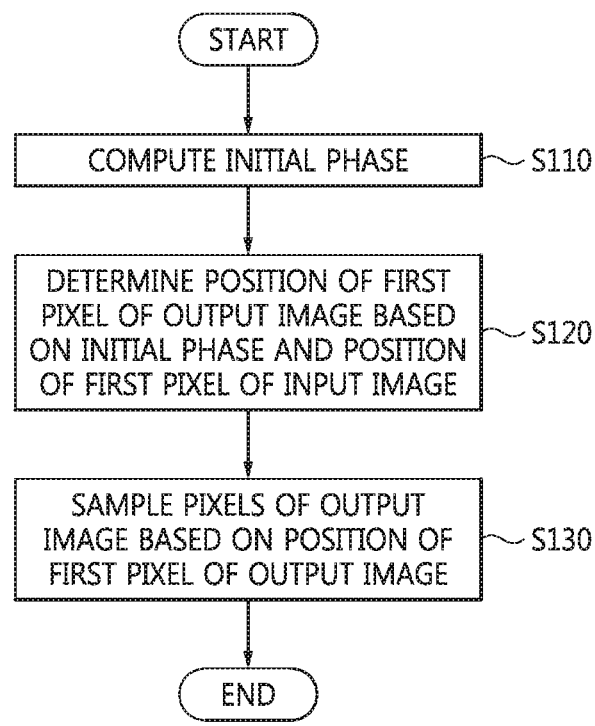
FIG. 2 is a flowchart illustrating a method of operating the data processing system illustrated in FIG. 1A according to an exemplary embodiment of the present inventive concept.

FIG. 2 is a flowchart illustrating a method of operating the data processing system 100 illustrated in FIG. 1A according to an exemplary embodiment of the present inventive concept. Referring to FIGS. 1A and 2, the CPU 210 or the multimedia processing circuit 230 may compute an initial phase based on a difference between a position of an input image and a position of an output image in operation S110. In an exemplary embodiment of the present inventive concept, the CPU 210 or the multimedia processing circuit 230 may compute the initial phase based on a scaling ratio between the input and output images. In an exemplary embodiment of the present inventive concept, the CPU 210 or the multimedia processing circuit 230 may compute the initial phase based on chroma subsampling format conversion information indicating that a format of an input image is converted into a format of an output image. In an exemplary embodiment of the present inventive concept, the CPU 210 or the multimedia processing circuit 230 may compute the initial phase based on rotation angle information indicating a rotation angle of the input image. For example, the CPU 210 or the multimedia processing circuit 230 may compute the initial phase based on at least one among the scaling ratio, the chroma subsampling format conversion information, and the rotation angle information in operation S110.

The multimedia processing circuit 230 may compute a position of a first pixel of the output image based on the initial phase and a position of a first pixel of the input image in operation S120. The multimedia processing circuit 230 may generate the output image including output pixels or sample the output pixels of the output image based on input pixels included in the input image and the position of the first pixel of the output image in operation S130.

Figure 3A:
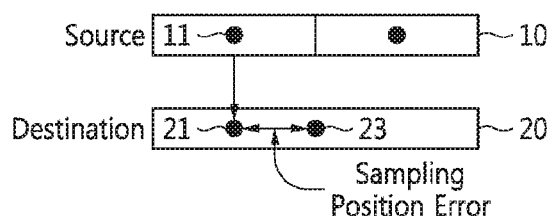
FIGS. 3A through 3D are diagrams for explaining position correction performed on a first pixel of an output image when an input image is scaled into the output image according to an exemplary embodiment of the present inventive concept.
Figure 3B:
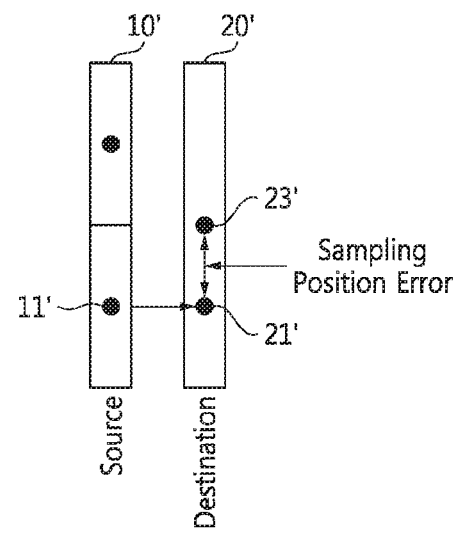

FIGS. 3A through 3D are diagrams for explaining position correction performed on a first pixel of an output image when an input image is scaled into the output image according to an exemplary embodiment of the present inventive concept. An input image 10 or 10' is an image input to the multimedia processing circuit 230, and an output image 20 or 20' is an image output from the multimedia processing circuit 230. A pixel may include at least one among a luma pixel and a chroma pixel. FIGS. 3A and 3B illustrate cases in which a position of a first pixel 21 of an output image is not corrected. When the position of the first pixel 21 of the output image 20 is the same as a position of a first pixel 11 of the input image 10, as shown in FIG. 3A, image distortion may occur in the output image 20. For example, when the position of the first pixel 21 of the output image 20 is the same as the position of the first pixel 11 of the input image 10, a sampling position error may occur, with respect to, e.g., the position of the first pixel 21 of the output image 20.

While the position of the first pixel 11 of the input image 10 and the position of the first pixel 21 of the output image 20 are illustrated in a horizontal direction in FIG. 3A, a position of a first pixel 21' of the output image 20' and a position of a first pixel 11' of the input image 10' are illustrated in a vertical direction in FIG. 3B. When the position of the first pixel 21' of the output image 20' is the same as the position of the first pixel 11' of the input image 10', image distortion may occur in the output image 20'. As shown in FIGS. 3A and 3B, a magnitude and a direction of the sampling position error may be determined based on a scaling ratio between the input image (e.g., 10) and the output image (e.g., 20).

Figure 3C:
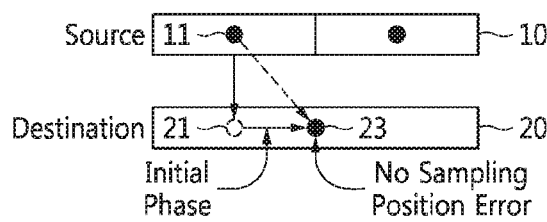
Figure 3D:
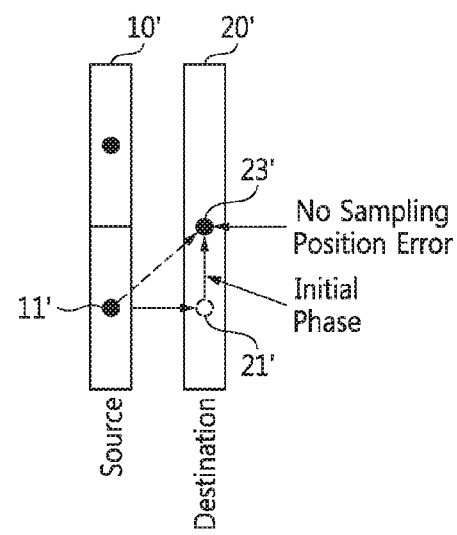

FIGS. 3C and 3D illustrate cases in which a position of a first pixel of an output image is corrected. When the position of the first pixel 21 of the output image 20 is corrected in the horizontal direction to a correct position 23 by the multimedia processing circuit 230, the corrected first pixel 23 of the output image 20 is sampled at an accurate position. As shown in FIG. 3D, when the position of the first pixel 21' of the output image 20' is corrected in the vertical direction to a correct position 23', the corrected first pixel 23' of the output image 20' is sampled at an accurate position. A magnitude and a direction of an initial phase may be used to correct the position of the first pixel of the output image. Here, the 'correction' may be understood to mean 'compensation'.

Figure 4:
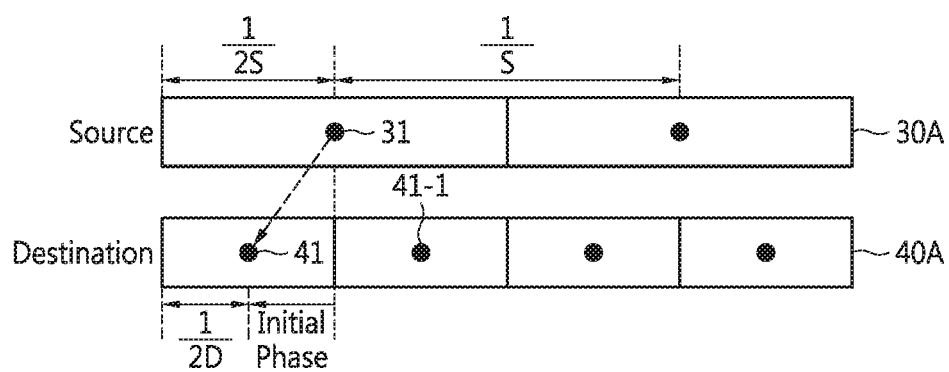
FIGS. 4 and 5 are diagrams for explaining methods of computing an initial phase based on a scaling ratio between input and output images according to an exemplary embodiment of the present inventive concept.
Figure 5:
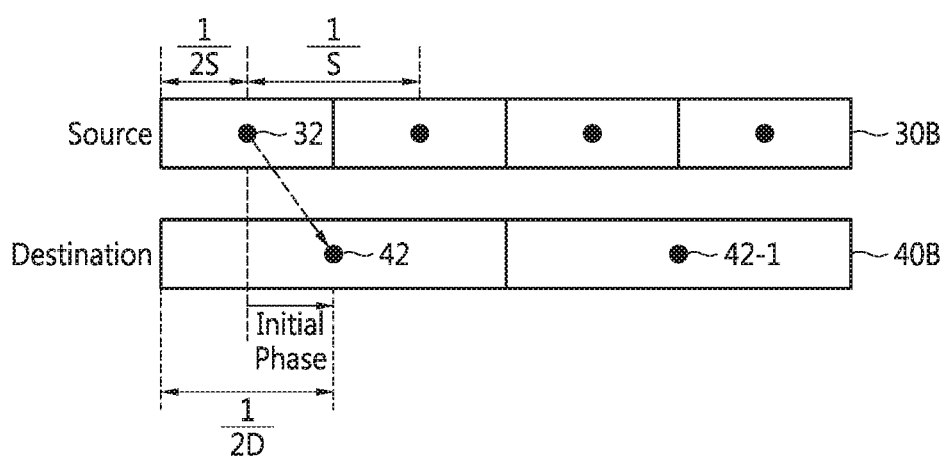

FIGS. 4 and 5 are diagrams for explaining methods of computing an initial phase based on a scaling ratio between input and output images according to an exemplary embodiment of the present inventive concept. Referring to FIG. 4, when the multimedia processing circuit 230 scales up an input image 30A and generates a scaled-up image, e.g., an output image 40A, a position of a first pixel 41 of the output image 40A may shift in a negative direction (e.g., to the left) on the basis of a position of a first pixel 31 of the input image 30A.

For example, when the width (e.g., the number of pixels within a unit length (e.g., 1)) of the input image 30A is S and the width (e.g., the number of pixels within a unit length (e.g., 1)) of the output image 40A is D, a difference in position (e.g., initial phase) between the first pixel 31 of the input image 30A and the first pixel 41 of the output image 40A is (½D−½S) (e.g., −⅛ when S=2 and D=4). When an interval between adjacent two pixels of the input image 30A and an interval between adjacent two pixels of the output image 40A are normalized to 1/S, and thus, the initial phase after the normalizations may be (S−D)/2D (e.g., −¼ when S=2 and D=4).

A position of a second pixel 41-1 of the output image 40A may be determined based on the position of the first pixel 41 of the output image 40A and a scaling ratio (e.g., D/S) between the input image 30A and the output image 40A. For example, the position of the second pixel 41-1 of the output image 41A may be determined to be shifted to the right direction by 1/D×scaling ratio (e.g., ½) from the first pixel 41 of the output image 41A. Here, '×' denotes multiplication. For example, when the initial phase is determined, the position of the first pixel 41 of the output image 40A may determined based on the initial phase and the position of the first pixel 31 of the input image 30A. In addition, the position of each of output pixels of the output image 40A may be determined based on the position of the first pixel 41 and the scaling ratio.

Referring to FIG. 5, when the multimedia processing circuit 230 scales down an input image 30B and generates a scaled-down image, e.g., an output image 40B, a position of a first pixel 42 of the output image 40B may shift in a positive direction (e.g., to the right) on the basis of a position of a first pixel 32 of the input image 30B. For example, when the width S of the input image 30B is 4 and the width of the output image 40B is 2, a difference in position (e.g., initial phase) between the first pixel 32 of the input image 30B and the first pixel 42 of the output image 40B is +⅛. When an interval between adjacent two pixels of the input image 30B and an interval between adjacent two pixels of the output image 40B are normalized to 1/S, and thus, the initial phase after the normalizations may be (S−D)/2D (e.g., +½ when S=4 and D=2).

A position of a second pixel 42-1 of the output image 40B may be determined based on the position of the first pixel 42 of the output image 40B and the scaling ratio (e.g., D/S) between the input image 30B and the output image 40B. For example, the position of the second pixel 42-1 of the output image 41B may be determined to be shifted to the right direction by 1/D×scaling ratio (e.g., ¼) from the first pixel 42 of the output image 41B. For example, when the initial phase is determined, the position of the first pixel 42 of the output image 40B may be determined based on the initial phase and the position of the first pixel 32 of the input image 30B. In addition, the position of each of output pixels of the output image 40B may be determined based on the position of the first pixel 42 and the scaling ratio.

Figure 6A:
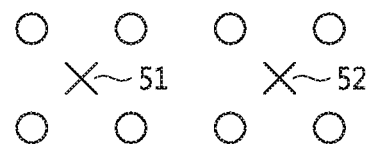
FIGS. 6A through 6D are diagrams illustrating chroma sampling methods according to an exemplary embodiment of the present inventive concept.
Figure 6B:
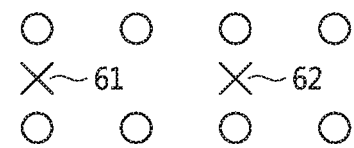
Figure 6C:
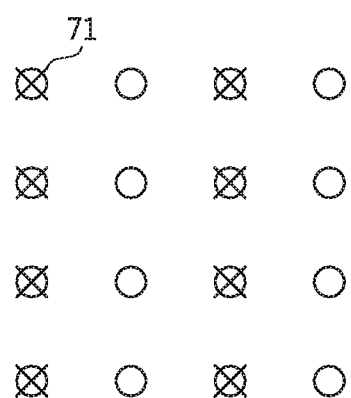
Figure 6D:
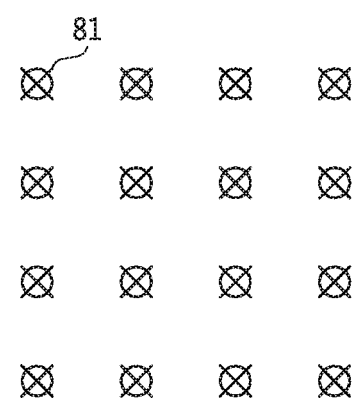

FIGS. 6A through 6D are diagrams illustrating chroma sampling methods according to an exemplary embodiment of the present inventive concept. FIG. 6A illustrates a chroma sampling method used in an image having a format YUV420 for H.261, H263, and MPEG-1 according to an exemplary embodiment of the present inventive concept. FIG. 6B illustrates a chroma sampling method used in an image having a format YUV420 for MPEG-2 according to an exemplary embodiment of the present inventive concept. FIG. 6C illustrates a chroma sampling method used in an image having a format YUV422 according to an exemplary embodiment of the present inventive concept. FIG. 6D illustrates a chroma sampling method used in an image having a format YUV444 according to an exemplary embodiment of the present inventive concept. Here, symbols "O" and "X" correspond to a Y sample (e.g., a luma sample) and a C sample (e.g., a chroma sample), respectively.

FIGS. 7 through 10 are diagrams of initial phase values corresponding to a position change of a first chroma pixel of an output image when a format of an input image is YUV444 or YUV422 according to an exemplary embodiment of the present inventive concept. Referring to FIGS. 7 through 16, chroma samples of an input image and chroma samples of an output image are illustrated together. Chroma samples of YUV420 (for H.263) are presented together with YUV444 in the right portion of FIG. 7.

Figure 7:
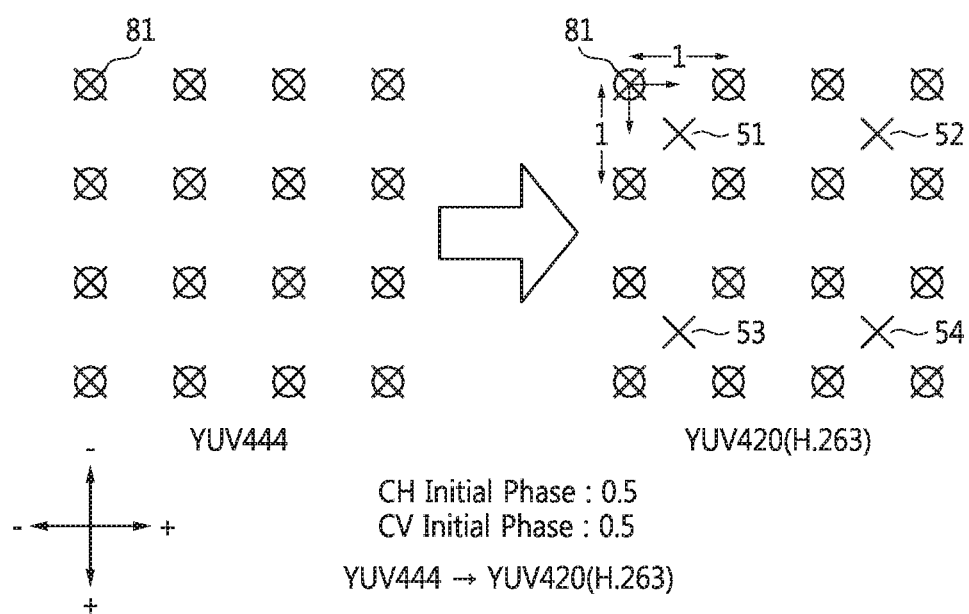
FIGS. 7 through 10 are diagrams of initial phase values corresponding to a position change of a first chroma pixel of an output image when a format of an input image is YUV444 or YUV422 according to an exemplary embodiment of the present inventive concept.

Referring to FIG. 7, when a format of an input image (e.g., a source image) is YUV444 and a format of an output image (e.g., a destination image) is YUV420 (for H.263), e.g., when a chroma subsampling mode or method is changed, a position of a first chroma pixel (e.g., a chroma sample 51) of the output image is different from a position of a first chroma pixel (e.g., a chroma sample 81) of the input image. In addition, a position of a first luma pixel (e.g., a luma sample) of the output image is the same as a position of a first luma pixel (e.g., a luma sample) of the input image.

In this case, an initial phase in a horizontal direction, e.g., a CH initial phase, is 0.5, and an initial phase in a vertical direction, e.g., a CV initial phase, is 0.5. For example, the position of the first chroma pixel 51 of the output image may be determined based on the CH initial phase, the CV initial phase, and the position of the first chroma pixel 81 of the input image. When the position of the first chroma pixel 51 of the output image is determined, the position of each of chroma pixels 52, 53, and 54 included in the output image may be determined according to the format (e.g., YUV420 (for H.263)) of the output image.

Figure 8:
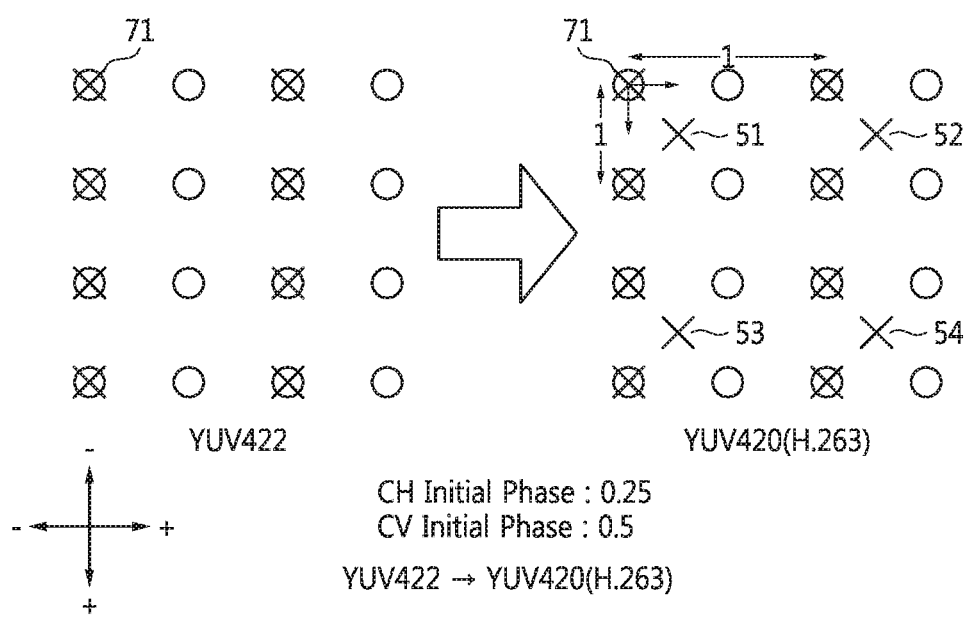

Referring to FIG. 8, when a format of an input image is YUV422 and the format of an output image is YUV420 (for H.263), the position of the first chroma pixel 51 of the output image is different from a position of a first chroma pixel 71 of the input image. A position of a first luma pixel (e.g., a luma sample) of the output image is the same as a position of a first luma pixel (e.g., a luma sample) of the input image. Chroma samples of YUV420 (for H.263) are presented together with YUV422 in the right portion of FIG. 8.

In this case, a CH initial phase is 0.25 and a CV initial phase is 0.5. For example, the position of the first chroma pixel 51 of the output image may be determined based on the CH initial phase, the CV initial phase, and the position of the first chroma pixel 71 of the input image. When the position of the first chroma pixel 51 of the output image is determined, the position of each of the chroma pixels 52, 53, and 54 included in the output image may be determined according to the format (e.g., YUV420 (for H.263)) of the output image.

Figure 9:
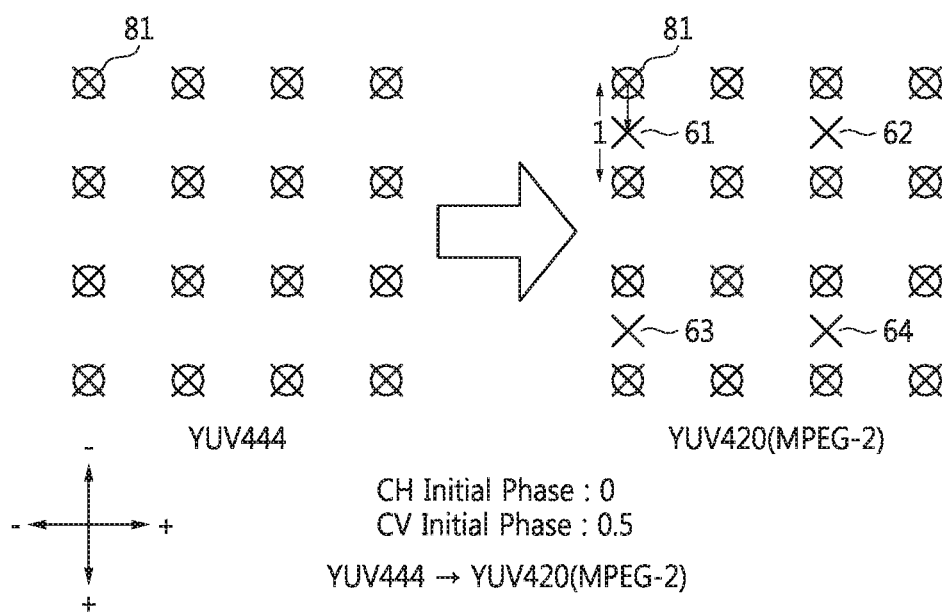

Referring to FIG. 9, when a format of an input image is YUV444 and a format of an output image is YUV420 (for MPEG-2), a position of a first chroma pixel 61 of the output image is different from the position of the first chroma pixel 81 of the input image. In this case, a CH initial phase is 0 and a CV initial phase is 0.5. For example, the position of the first chroma pixel 61 of the output image may be determined based on the CH initial phase, the CV initial phase, and the position of the first chroma pixel 81 of the input image. When the position of the first chroma pixel 61 of the output image is determined, the position of each of chroma pixels 62, 63, and 64 included in the output image may be determined according to the format (e.g., YUV420 (for MPEG-2)) of the output image. Chroma samples of YUV420 (for MPEG-2) are presented together with YUV444 in the right portion of FIG. 9.

Figure 10:
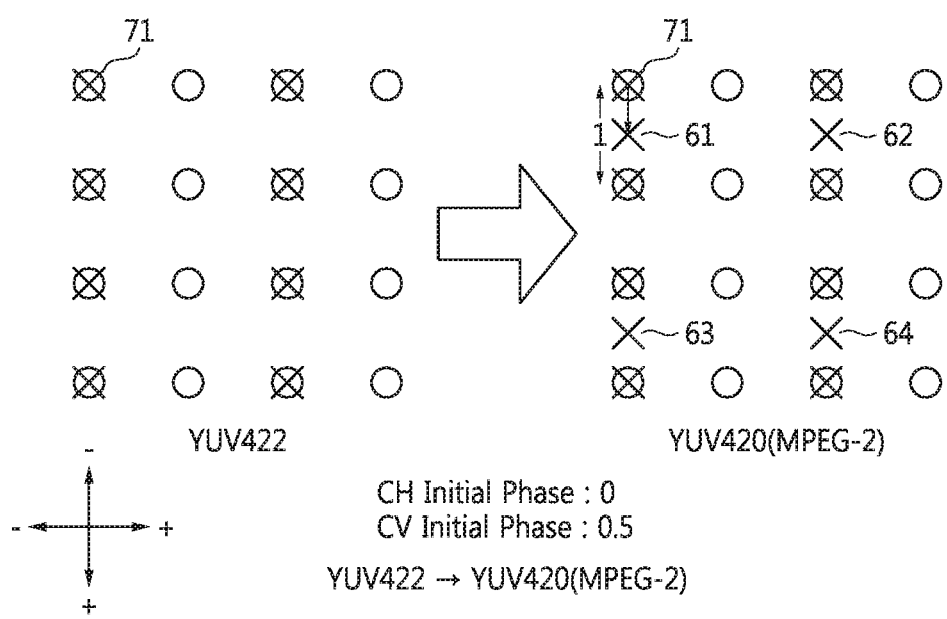

Referring to FIG. 10, when a format of an input image is YUV422 and a format of an output image is YUV420 (for MPEG-2), the position of the first chroma pixel 61 of the output image is different from the position of the first chroma pixel 71 of the input image. In this case, a CH initial phase is 0 and a CV initial phase is 0.5. Chroma samples of YUV420 (for MPEG-2) are presented together with YUV422 in the right portion of FIG. 10.

For example, the position of the first chroma pixel 61 of the output image may be determined based on the CH initial phase, the CV initial phase, and the position of the first chroma pixel 71 of the input image. When the position of the first chroma pixel 61 of the output image is determined, the position of each of the chroma pixels 62, 63, and 64 included in the output image may be determined according to the format (e.g., YUV420 (for MPEG-2)) of the output image.

As shown in FIGS. 7 through 10, an input image is not scaled up or down into an output image, and therefore, correction of positions to luma pixels or luma samples included in the output image might not be performed.

FIGS. 11 through 16 are diagrams of initial phase values corresponding to a position change of a first chroma pixel of an output image when a format of an input image is YUV420 according to an exemplary embodiment of the present inventive concept.

Figure 11:
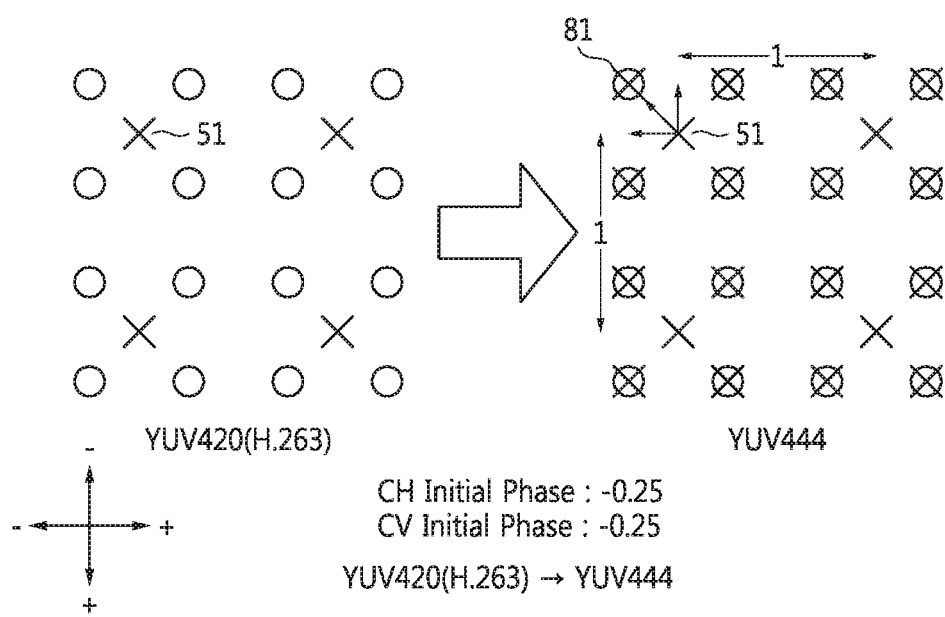
FIGS. 11 through 16 are diagrams of initial phase values corresponding to a position change of a first chroma pixel of an output image when a format of an input image is YUV420 according to an exemplary embodiment of the present inventive concept.

Referring to FIG. 11, when a format of an input image is YUV420 (for H.263) and a format of an output image is YUV444, the position of the first chroma pixel (e.g., a chroma sample 81) of the output image is different from the position of the first chroma pixel (e.g., a chroma sample 51) of the input image. In this case, a CH initial phase is −0.25 and a CV initial phase is −0.25. Chroma samples of YUV444 are presented together with YUV420 (for H.263) in the right portion of FIG. 11.

For example, the position of the first chroma pixel 81 of the output image may be determined based on the CH initial phase, the CV initial phase, and the position of the first chroma pixel 51 of the input image. When the position of the first chroma pixel 81 of the output image is determined, the position of each of other chroma pixels included in the output image may be determined according to the format of the output image.

Figure 12:
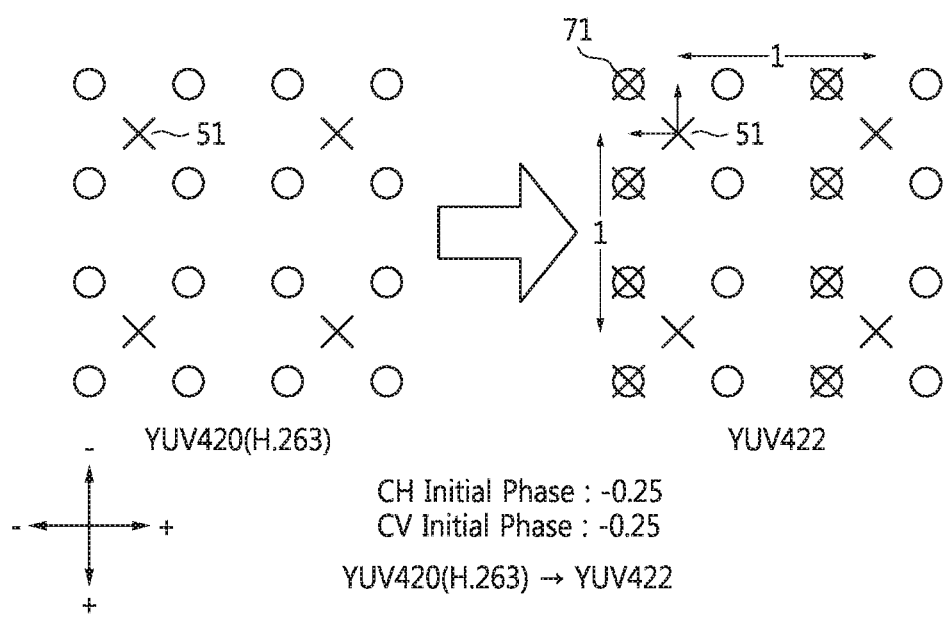

Referring to FIG. 12, when a format of an input image is YUV420 (for H.263) and a format of an output image is YUV422, the position of the first chroma pixel 71 of the output image is different from the position of the first chroma pixel 51 of the input image. In this case, a CH initial phase is −0.25 and a CV initial phase is −0.25.

For example, the position of the first chroma pixel 71 of the output image may be determined based on the CH initial phase, the CV initial phase, and the position of the first chroma pixel 51 of the input image. When the position of the first chroma pixel 71 of the output image is determined, the position of each of other chroma pixels included in the output image may be determined according to the format of the output image.

Figure 13:
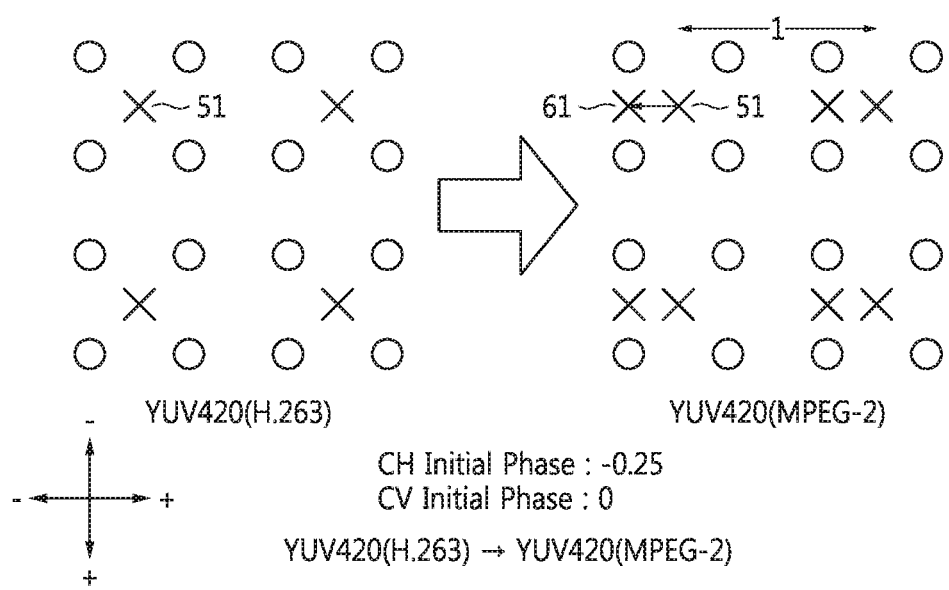

Referring to FIG. 13, when a format of an input image is YUV420 (for H.263) and a format of an output image is YUV420 (for MPEG-2), the position of the first chroma pixel 61 of the output image is different from the position of the first chroma pixel 51 of the input image. In this case, a CH initial phase is −0.25 and a CV initial phase is 0.

For example, the position of the first chroma pixel 61 of the output image may be determined based on the CH initial phase, the CV initial phase, and the position of the first chroma pixel 51 of the input image. When the position of the first chroma pixel 61 of the output image is determined, the position of each of other chroma pixels included in the output image may be determined according to the format of the output image.

Figure 14:
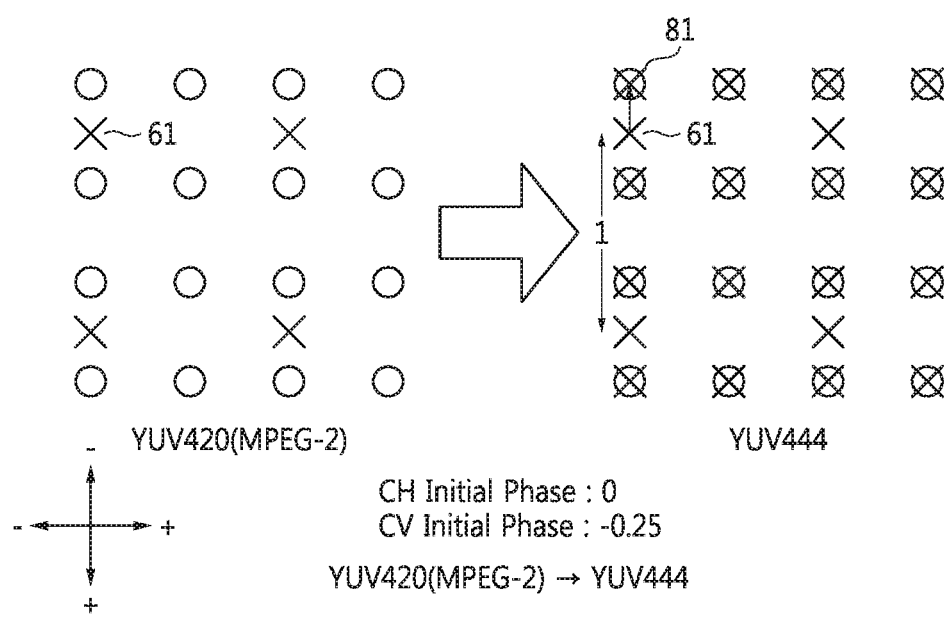

Referring to FIG. 14, when a format of an input image is YUV420 (for MPEG-2) and a format of an output image is YUV444, the position of the first chroma pixel 81 of the output image is different from the position of the first chroma pixel 61 of the input image. In this case, a CH initial phase is 0 and a CV initial phase is −0.25.

For example, the position of the first chroma pixel 81 of the output image may be determined based on the CH initial phase, the CV initial phase, and the position of the first chroma pixel 61 of the input image. When the position of the first chroma pixel 81 of the output image is determined, the position of each of other chroma pixels included in the output image may be determined according to the format of the output image.

Figure 15:
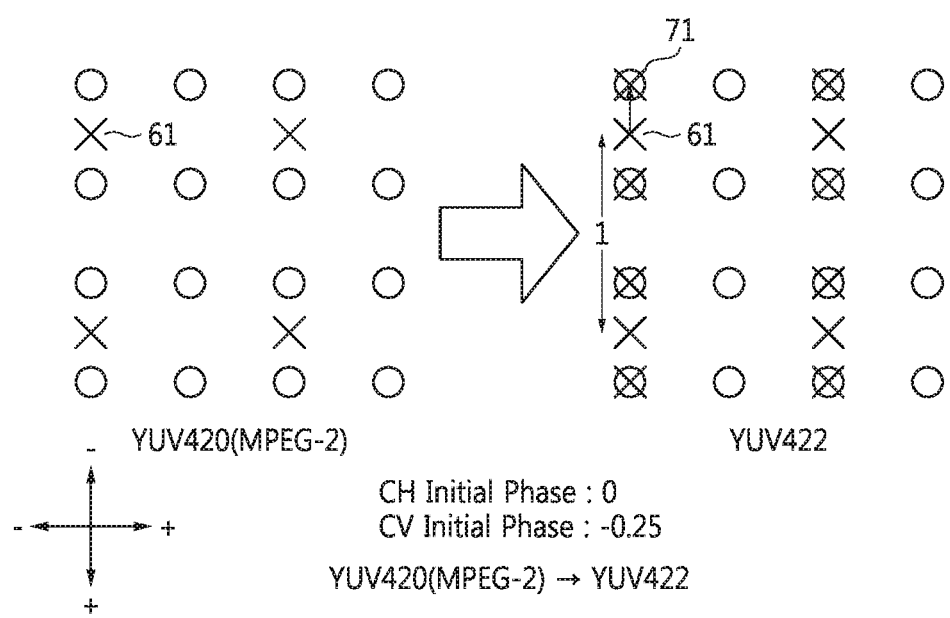

Referring to FIG. 15, when a format of an input image is YUV420 (for MPEG-2) and a format of an output image is YUV422, the position of the first chroma pixel 71 of the output image is different from the position of the first chroma pixel 61 of the input image. In this case, a CH initial phase is 0 and a CV initial phase is −0.25.

For example, the position of the first chroma pixel 71 of the output image may be determined based on the CH initial phase, the CV initial phase, and the position of the first chroma pixel 61 of the input image. When the position of the first chroma pixel 71 of the output image is determined, the position of each of other chroma pixels included in the output image may be determined according to the format of the output image.

Figure 16:
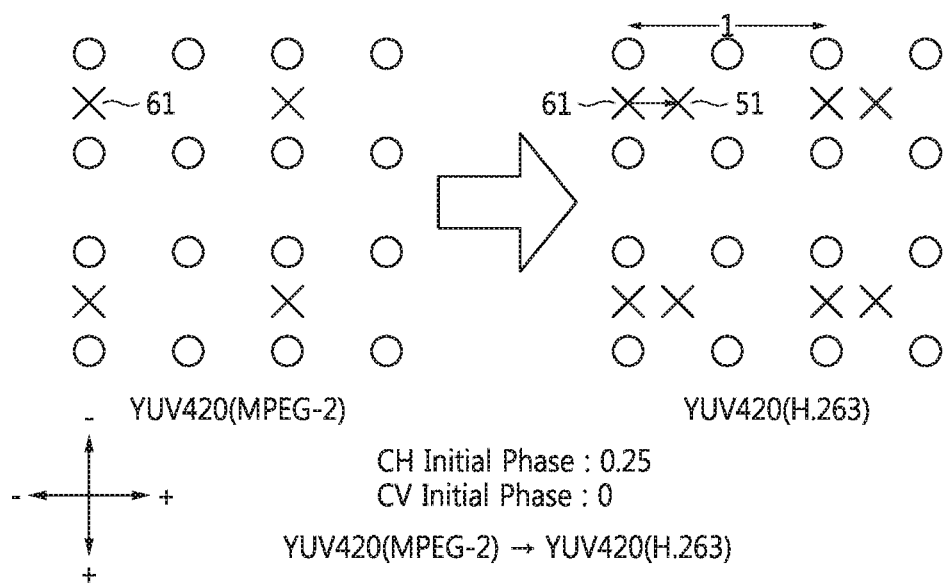

Referring to FIG. 16, when a format of an input image is YUV420 (for MPEG-2) and a format of an output image is YUV420 (for H.263), the position of the first chroma pixel 51 of the output image is different from the position of the first chroma pixel 61 of the input image. In this case, a CH initial phase is 0.25 and a CV initial phase is 0.

For example, the position of the first chroma pixel 51 of the output image may be determined based on the CH initial phase, the CV initial phase, and the position of the first chroma pixel 61 of the input image. When the position of the first chroma pixel 51 of the output image is determined, the position of each of other chroma pixels included in the output image may be determined according to the format of the output image.

As shown in FIGS. 11 through 16, an input image is not scaled up or down into an output image, and therefore, correction of positions to luma pixels or luma samples included in the output image might not be performed.

FIGS. 17 through 24 are diagrams of initial phase values corresponding to a position change of a first chroma pixel of an output image when the format of an input image is YUV422 or YUV420 (for MPEG-2) according to an exemplary embodiment of the present inventive concept. Referring to FIGS. 17 through 24, when a format of an input image is YUV422 or YUV420 (for MPEG-2), the input image is rotated at a predetermined angle by the data processing device 100, or the input image is rotated and flipped by the data processing device 100, a position of a first chroma pixel of an output image is different from a position of a first chroma pixel of the input image. Therefore, an initial phase is used to correctly subsample chroma pixels included in the output image. The input image is not scaled up or down into an output image in cases illustrated in FIGS. 17 through 24.

Figure 17:
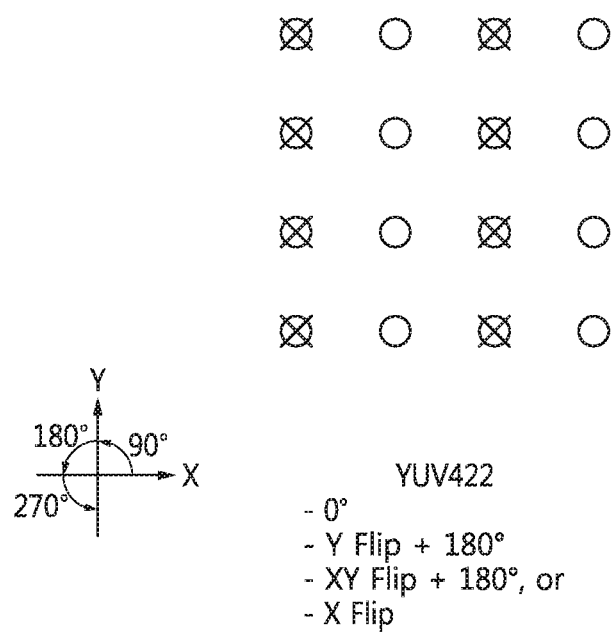
FIGS. 17 through 24 are diagrams of initial phase values corresponding to a position change of a first chroma pixel of an output image when a format of an input image is YUV444 or YUV422 according to an exemplary embodiment of the present inventive concept.

FIG. 17 shows an output image when a format of an input image is YUV422 and one of the following operations is performed on the input image: (1) no rotation: 0°; (2) flip in a Y-axis direction and 180° rotation: Y flip+180°; (3) flip in the Y-axis direction after flip in an X-axis direction and 180° rotation: XY flip+180°; and (4) flip in the X-axis direction: X flip.

Figure 18:
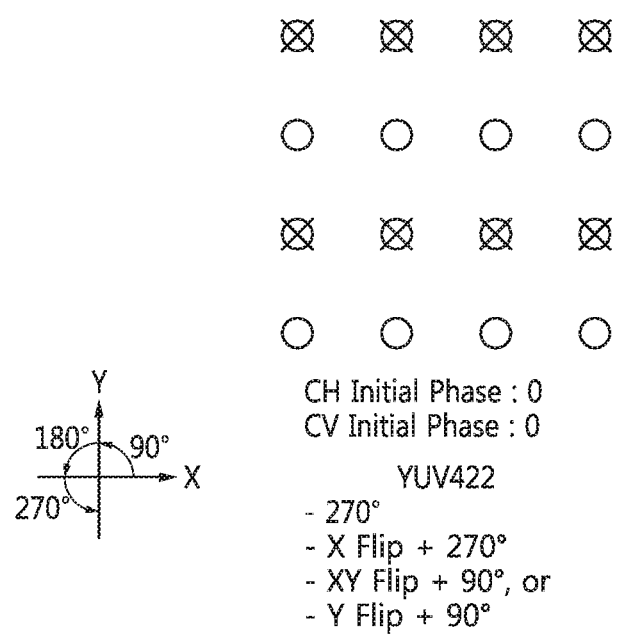

FIG. 18 shows an output image when a format of an input image is YUV422 and one of the following operations is performed on the input image: (1) 270° rotation: 270°; (2) flip in the X-axis direction and 270° rotation: X flip+270°; (3) flip in the Y-axis direction after flip in the X-axis direction and 90° rotation: XY flip+90°; and (4) flip in the Y-axis direction and 90° rotation: Y flip+90°. In this case, a CH initial phase is 0 and a CV initial phase is 0.

Figure 19:
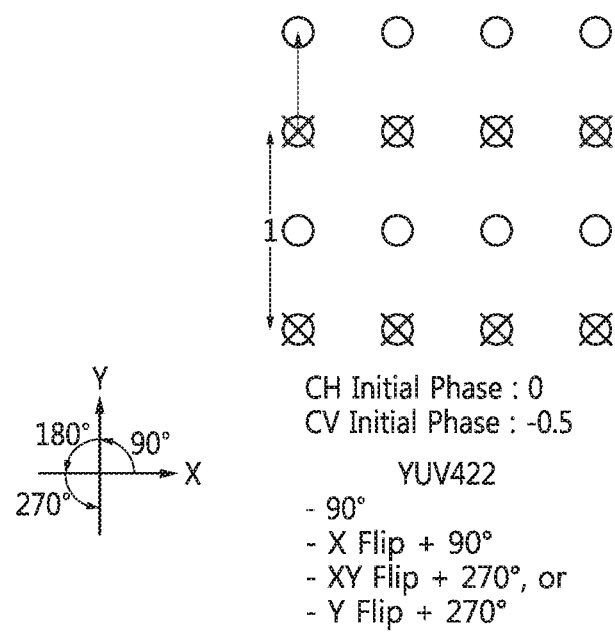

FIG. 19 shows an output image when the format of an input image is YUV422 and one of the following operations is performed on the input image: (1) 90° rotation: 90°; (2) flip in the X-axis direction and 90° rotation: X flip+90°; (3) flip in the Y-axis direction after flip in the X-axis direction and 270° rotation: XY flip+270°; and (4) flip in the Y-axis direction and 270° rotation: Y flip+270°. In this case, a CH initial phase is 0 and a CV initial phase is −0.5.

Figure 20:
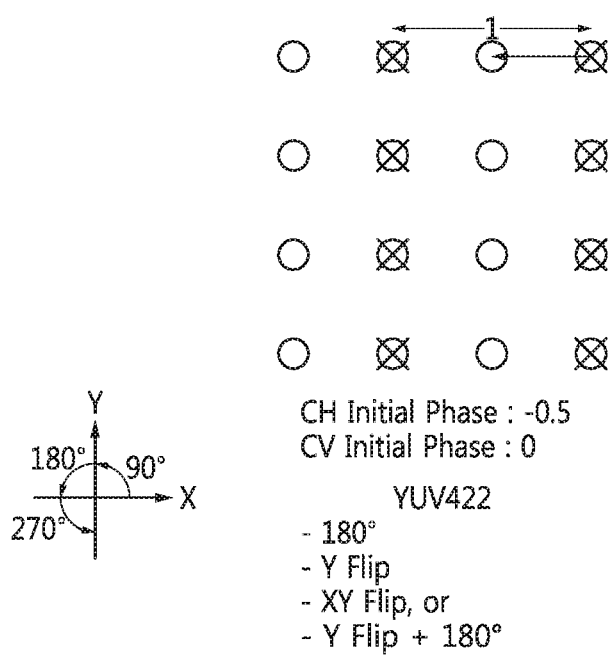

FIG. 20 shows an output image when a format of an input image is YUV422 and one of the following operations is performed on the input image: (1) 180° rotation: 180°; (2) flip in the Y-axis direction: Y flip; (3) flip in the Y-axis direction after flip in the X-axis direction: XY flip; and (4) flip in the Y-axis direction and 180° rotation: Y flip+180°. In this case, a CH initial phase is −0.5 and a CV initial phase is 0.

Figure 21:
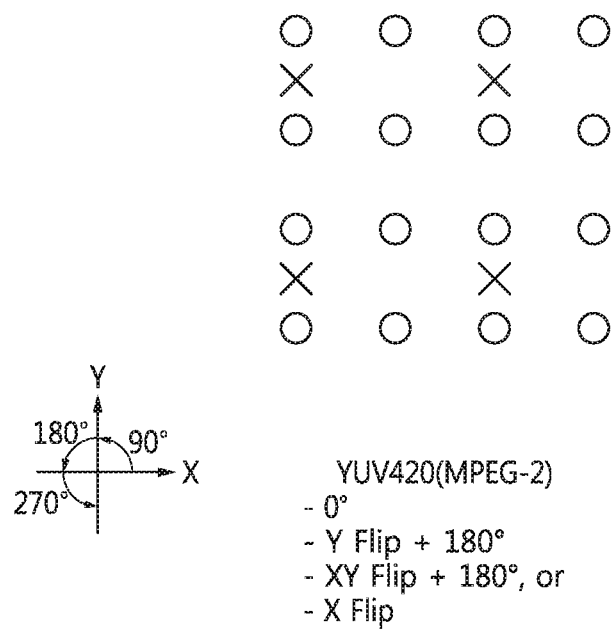

FIG. 21 shows an output image when a format of an input image is YUV420 (for MPEG-2) and one of the following operations is performed on the input image: (1) no rotation: 0°; (2) flip in the Y-axis direction and 180° rotation: Y flip+180°; (3) flip in the Y-axis direction after flip in the X-axis direction and 180° rotation: XY flip+180°; and (4) flip in the X-axis direction: X flip.

Figure 22:
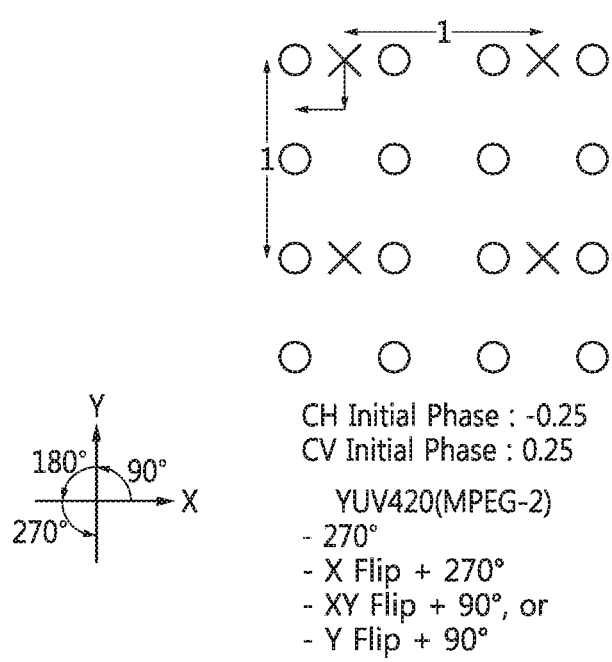

FIG. 22 shows an output image when a format of an input image is YUV420 (for MPEG-2) and one of the following operations is performed on the input image: (1) 270° rotation: 270°; (2) flip in the X-axis direction and 270° rotation: X flip+270°; (3) flip in the Y-axis direction after flip in the X-axis direction and 90° rotation: XY flip+90°; and (4) flip in the Y-axis direction and 90° rotation: Y flip+90°. In this case, a CH initial phase is 0 and a CV initial phase is 0.

Figure 23:
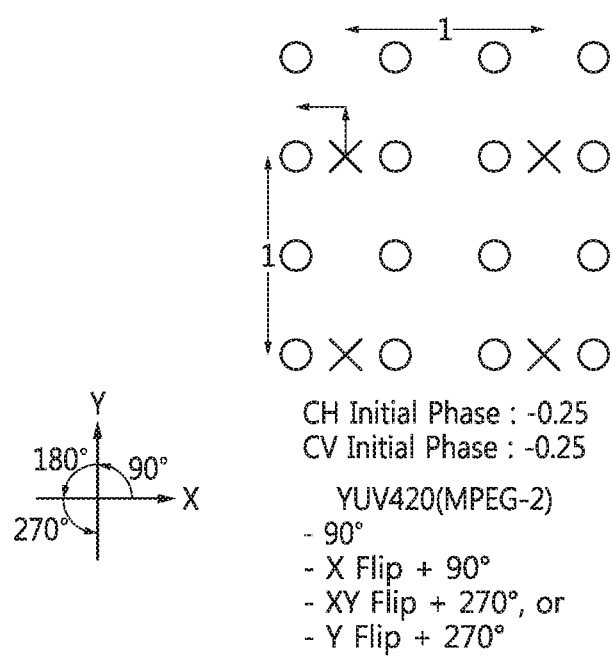

FIG. 23 shows an output image when a format of an input image is YUV420 (for MPEG-2) and one of the following operations is performed on the input image: (1) 90° rotation: 90°; (2) flip in the X-axis direction and 90° rotation: X flip+90°; (3) flip in the Y-axis direction after flip in the X-axis direction and 270° rotation: XY flip+270°; and (4) flip in the Y-axis direction and 270° rotation: Y flip+270°. In this case, a CH initial phase is 0 and a CV initial phase is −0.5.

Figure 24:
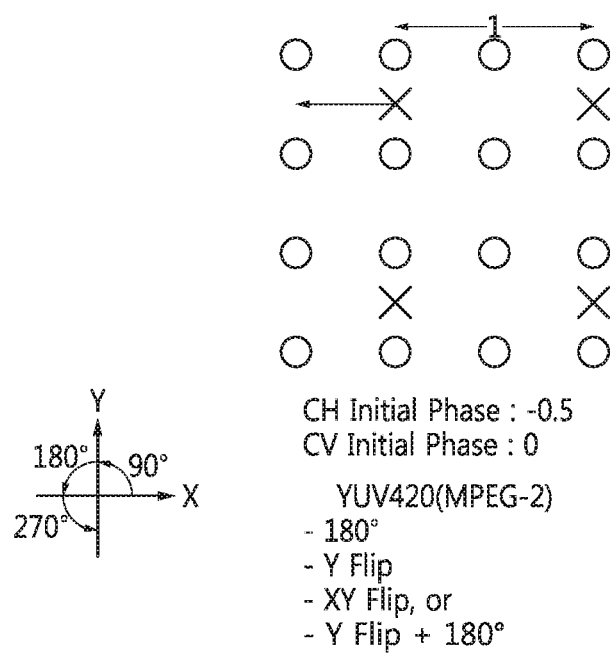

FIG. 24 shows an output image when the format of an input image is YUV420 (for MPEG-2) and one of the following operations is performed on the input image: (1) 180° rotation: 180°; (2) flip in the Y-axis direction: Y flip; (3) flip in the Y-axis direction after flip in the X-axis direction: XY flip; and (4) flip in the Y-axis direction and 180° rotation: Y flip+180°. In this case, a CH initial phase is −0.5 and a CV initial phase is 0.

FIGS. 25 through 28 are diagrams for explaining methods of computing an initial phase between input and output images when the format of the input image is YUV444 according to an exemplary embodiment of the present inventive concept. It is assumed that the multimedia processing circuit 230 scales down an input image at a scaling ratio, for example, of ½ or 2:1) and generates a scaled-down output image in an embodiment illustrated in FIGS. 25 through 28. In the following figures, the term "H/V-direction" indicates the horizontal or vertical direction. The term "rotation/no rotation" indicates that an input image is rotated or not rotated. The term "H-direction" indicates the horizontal direction, the term "V-direction" indicates the vertical direction.

Figure 25:
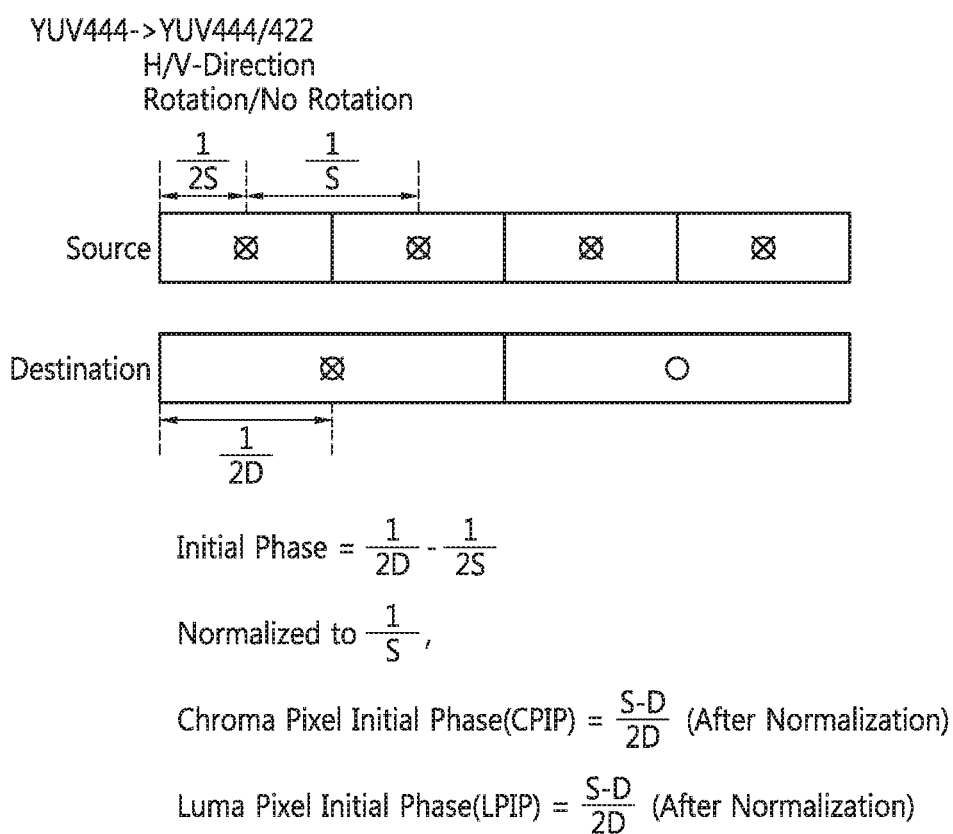
FIGS. 25 through 28 are diagrams for explaining methods of computing an initial phase when a format of an input image is YUV444 according to an exemplary embodiment of the present inventive concept.

Referring to FIG. 25, whether an input image is rotated or not, and when the scaling ratio between the input and output images is ½ (e.g., 2:1), the format of the input image is YUV444, and the format of the output image is YUV444 or YUV422, a luma pixel initial phase (e.g., LPIP=(S−D)/2D) corresponding to a difference in position between a first luma pixel (e.g., a luma sample) of the output image and a first luma pixel (e.g., a luma sample) of the input image may be computed in the horizontal or vertical direction. In addition, a chroma pixel initial phase (e.g., CPIP=(S−D)/2D) corresponding to a difference in position between a first chroma pixel (e.g., a chroma sample) of the output image and a first chroma pixel (e.g., a chroma sample) of the input image may be computed in the horizontal or vertical direction.

Figure 26:
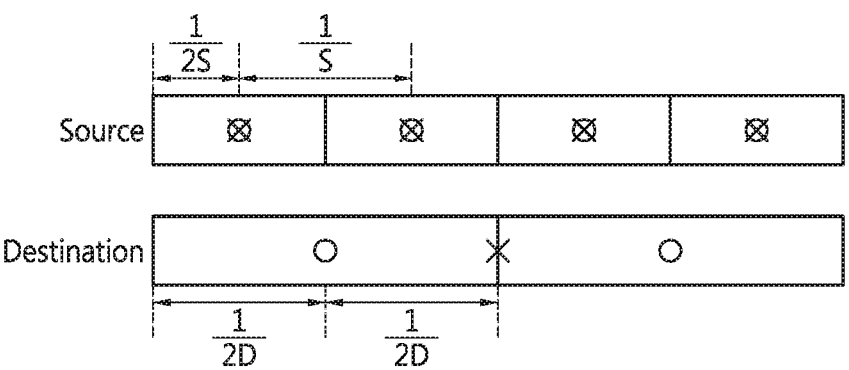

Referring to FIG. 26, whether an input image is rotated or not, and when the scaling ratio between the input and output images is ½ (e.g., 2:1), the format of the input image is YUV444, and the format of the output image is YUV420 (for H.263), an LPIP (e.g., (S−D)/2D) corresponding to a difference in position between a first luma pixel of the output image and a first luma pixel of the input image may be computed in the horizontal or vertical direction. In addition, a CPIP (e.g., (2S−D)/2D) corresponding to a difference in position between a first chroma pixel of the output image and a first chroma pixel of the input image may be computed in the horizontal or vertical direction.

Figure 27:
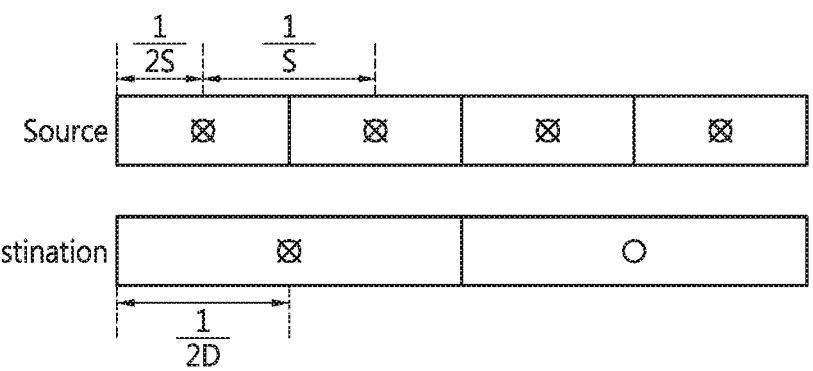

Referring to FIG. 27, whether an input image is rotated or not, and when the scaling ratio between the input and output images is ½ (e.g., 2:1), the format of the input image is YUV444, and the format of the output image is YUV420 (for MPEG-2), an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/2D) corresponding to a difference in position between a first chroma pixel of the output image and a first chroma pixel of the input image may be computed in the horizontal direction.

Figure 28:
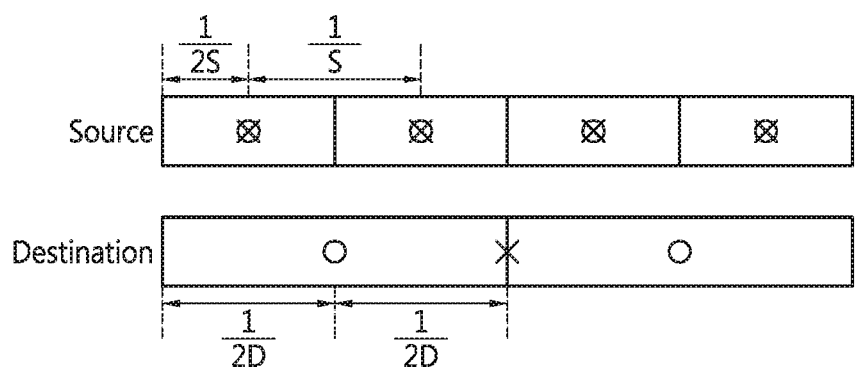

Referring to FIG. 28, whether an input image is rotated or not, and when the scaling ratio between the input and output images is ½ (e.g., 2:1), the format of the input image is YUV444, and the format of the output image is YUV420 (for MPEG-2), an LPIP (e.g., (S−D)/2D) corresponding to a difference in position between a first luma pixel of the output image and a first luma pixel of the input image may be computed in the horizontal or vertical direction. In addition, a CPIP (e.g., (2S−D)/2D) corresponding to a difference in position between a first chroma pixel of the output image and a first chroma pixel of the input image may be computed in the vertical direction.

FIGS. 29 through 44 are diagrams for explaining methods of computing an initial phase based on whether an input image is rotated, when the format of the input image is YUV422 according to an exemplary embodiment of the present inventive concept.

Figure 29:
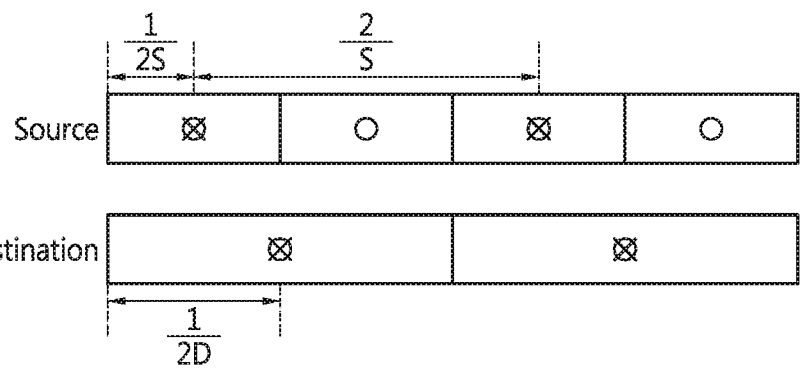
FIGS. 29 through 44 are diagrams for explaining methods of computing an initial phase based on whether an input image is rotated, when the format of the input image is YUV422 according to an exemplary embodiment of the present inventive concept.

Referring to FIG. 29, when an input image is not rotated, the scaling ratio between the input and output images is ½ (e.g., 2:1), the format of the input image is YUV422, and the format of the output image is YUV444, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the horizontal direction.

Figure 30:
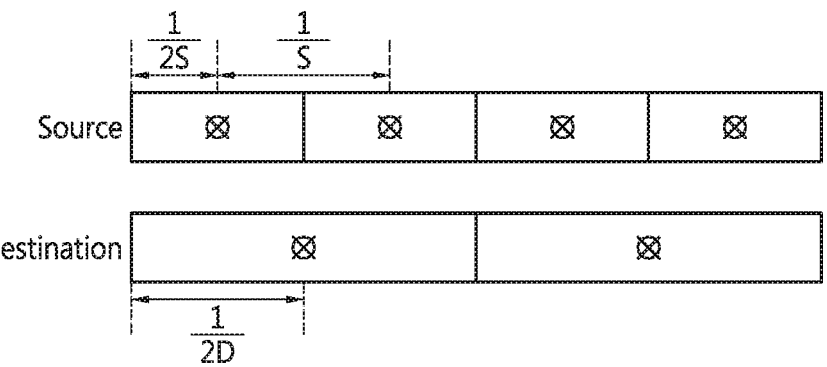

Referring to FIG. 30, when an input image is not rotated, the scaling ratio between the input and output images is ½ (e.g., 2:1), the format of the input image is YUV422, and the format of the output image is YUV444, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/2D) corresponding to a difference in position between a first chroma pixel of the output image and a first chroma pixel of the input image may be computed in the vertical direction.

Figure 31:
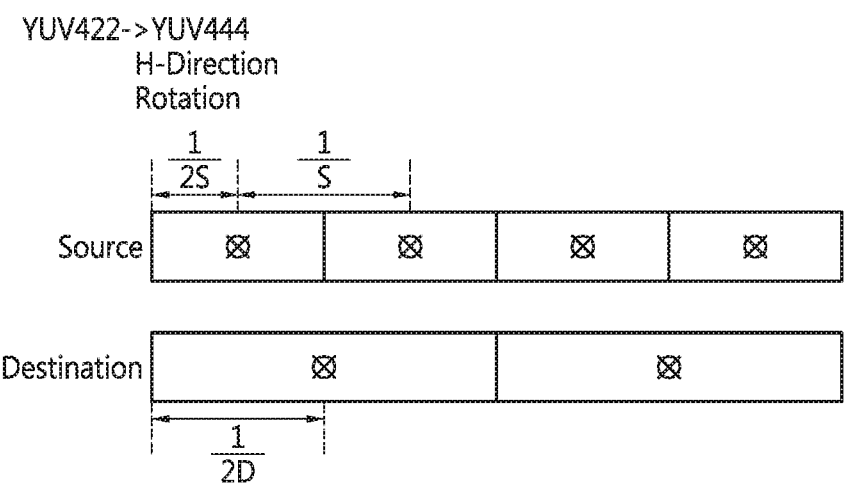

Referring to FIG. 31, when an input image is rotated, the scaling ratio between the input and output images is ½ (e.g., 2:1), the format of the input image is YUV422, and the format of the output image is YUV444, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/2D) corresponding to a difference in position between a first chroma pixel of the output image and a first chroma pixel of the input image may be computed in the horizontal direction.

Figure 32:
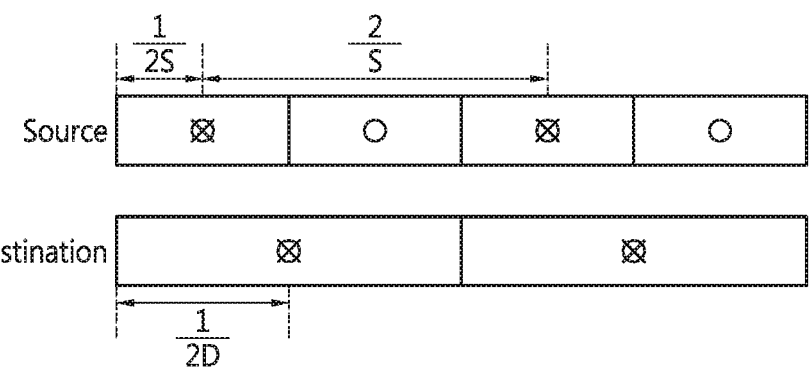

Referring to FIG. 32, when an input image is rotated, the scaling ratio between the input and output images is ½ (e.g., 2:1), the format of the input image is YUV422, and the format of the output image is YUV444, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the vertical direction.

Figure 33:
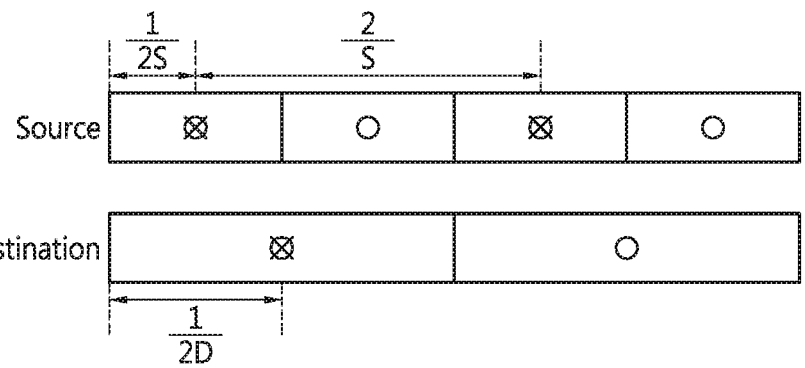

Referring to FIG. 33, when an input image is not rotated, the scaling ratio between the input and output images is ½ (e.g., 2:1), the format of the input image is YUV422, and the format of the output image is YUV422, an LPIP corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the horizontal direction.

Figure 34:
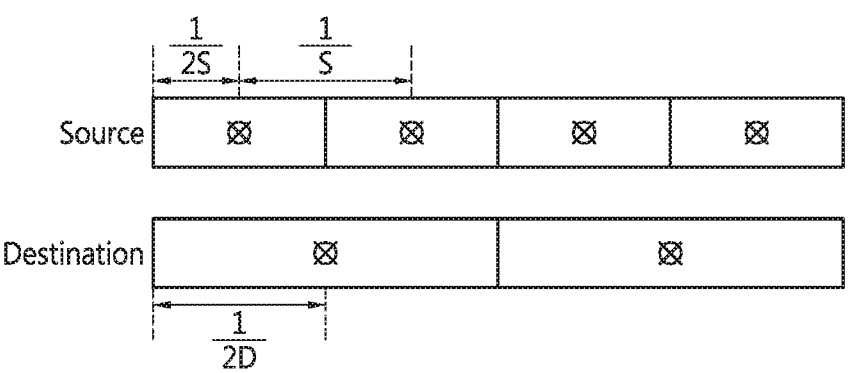

Referring to FIG. 34, when an input image is not rotated, the scaling ratio between the input and output images is ½ (e.g., 2:1), the format of the input image is YUV422, and the format of the output image is YUV422, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/2D) corresponding to a difference in position between a first chroma pixel of the output image and a first chroma pixel of the input image may be computed in the vertical direction.

Figure 35:
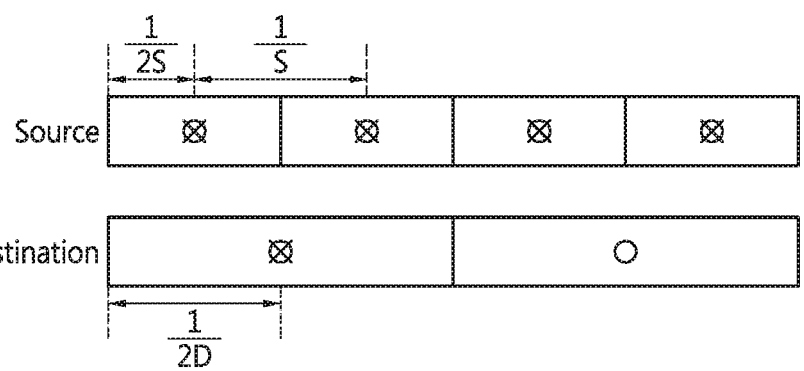

Referring to FIG. 35, when an input image is rotated, the scaling ratio between the input and output images is ½ (e.g., 2:1), the format of the input image is YUV422, and the format of the output image is YUV422, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/2D) corresponding to a difference in position between a first chroma pixel of the output image and a first chroma pixel of the input image may be computed in the horizontal direction.

Figure 36:
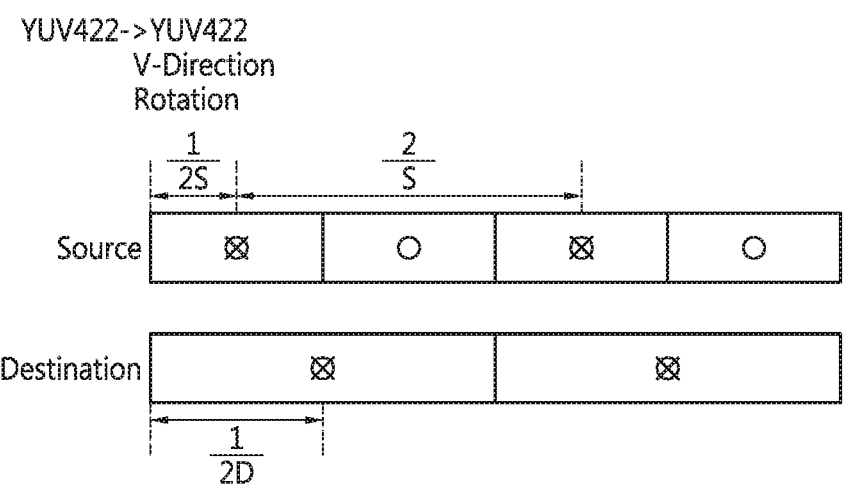

Referring to FIG. 36, when an input image is rotated, the scaling ratio between the input and output images is ½ (e.g., 2:1), the format of the input image is YUV422, and the format of the output image is YUV422, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the vertical direction.

Figure 37:
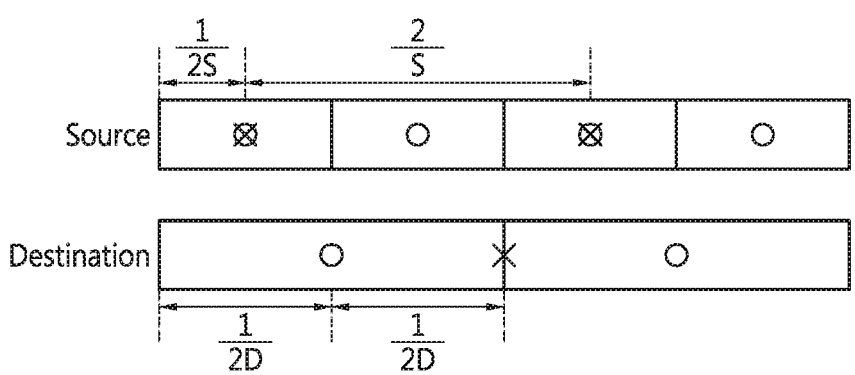

Referring to FIG. 37, when an input image is not rotated, the scaling ratio between the input and output images is ½ (e.g., 2:1), the format of the input image is YUV422, and the format of the output image is YUV420 (for H.263), an LPIP (e.g., (S−D)/2D) corresponding to a difference in position between a first luma pixel of the output image and a first luma pixel of the input image may be computed in the horizontal or vertical direction. In addition, a CPIP (e.g., (2S−D)/4D) corresponding to a difference in position between a first chroma pixel of the output image and a first chroma pixel of the input image may be computed in the horizontal direction.

Figure 38:
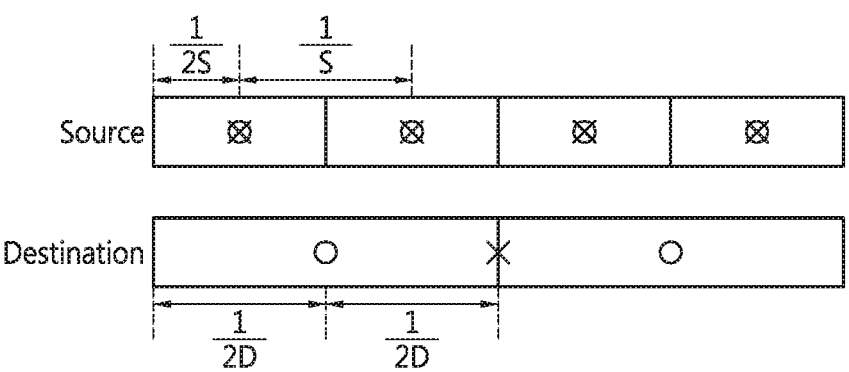

Referring to FIG. 38, when an input image is not rotated, the scaling ratio between the input and output images is ½ (e.g., 2:1), the format of the input image is YUV422, and the format of the output image is YUV420 (for H.263), an LPIP (e.g., (S−D)/2D) corresponding to a difference in position between a first luma pixel of the output image and a first luma pixel of the input image may be computed in the horizontal or vertical direction. In addition, a CPIP (e.g., (2S−D)/2D) corresponding to a difference in position between a first chroma pixel of the output image and a first chroma pixel of the input image may be computed in the vertical direction.

Figure 39:
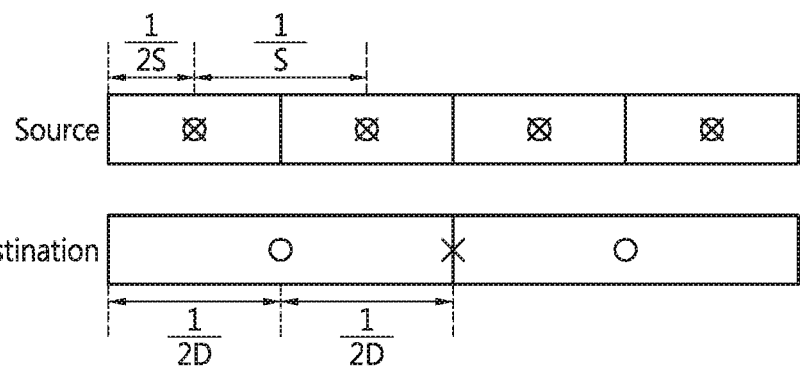

Referring to FIG. 39, when an input image is rotated, the scaling ratio between the input and output images is ½ (e.g., 2:1), the format of the input image is YUV422, and the format of the output image is YUV420 (for H.263), an LPIP (e.g., (S–D)/2D) corresponding to a difference in position between a first luma pixel of the output image and a first luma pixel of the input image may be computed in the horizontal or vertical direction. In addition, a CPIP (e.g., (2S–D)/2D) corresponding to a difference in position between a first chroma pixel of the output image and a first chroma pixel of the input image may be computed in the horizontal direction.

Figure 40:
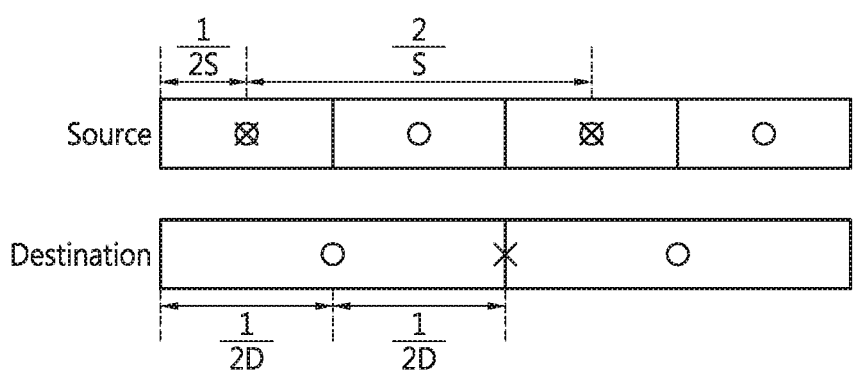

Referring to FIG. 40, when an input image is rotated, the scaling ratio between the input and output images is ½ (e.g., 2:1), the format of the input image is YUV422, and the format of the output image is YUV420 (for H.263), an LPIP corresponding to a difference in position between a first luma pixel of the output image and a first luma pixel of the input image may be computed in the horizontal or vertical direction. In addition, a CPIP (e.g., (2S–D)/4D) corresponding to a difference in position between a first chroma pixel of the output image and a first chroma pixel of the input image may be computed in the vertical direction.

Figure 41:
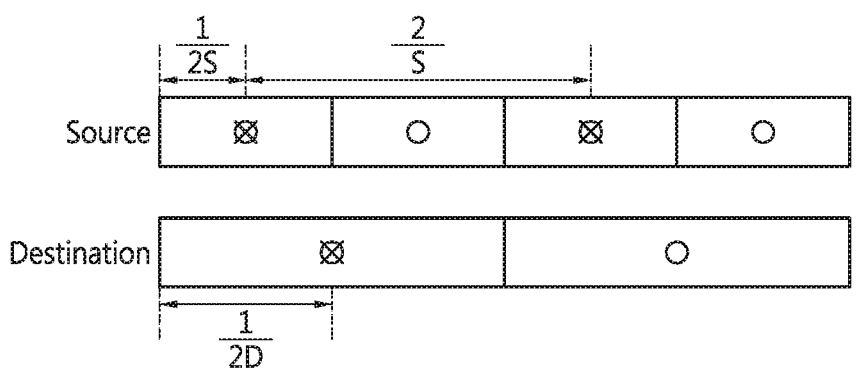

Referring to FIG. 41, when an input image is not rotated, the scaling ratio between the input and output images is ½ (e.g., 2:1), the format of the input image is YUV422, and the format of the output image is YUV420 (for MPEG-2), an LPIP (e.g., (S–D)/2D) corresponding to a difference in position between a first luma pixel of the output image and a first luma pixel of the input image may be computed in the horizontal or vertical direction. In addition, a CPIP (e.g., (S–D)/4D) corresponding to a difference in position between a first chroma pixel of the output image and a first chroma pixel of the input image may be computed in the horizontal direction.

Figure 42:
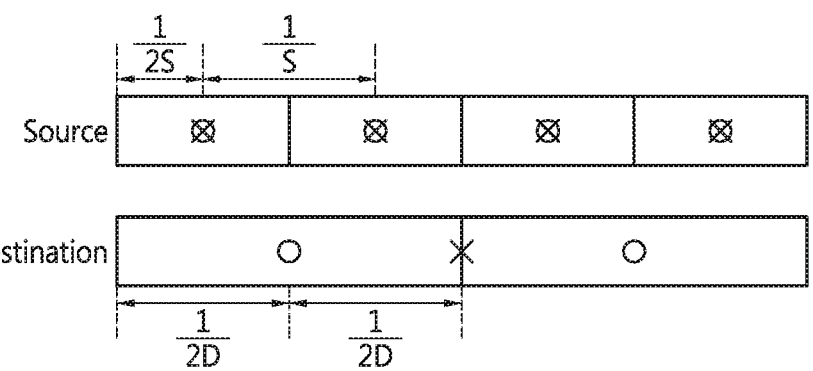

Referring to FIG. 42, when an input image is not rotated, the scaling ratio between the input and output images is ½ (e.g., 2:1), the format of the input image is YUV422, and the format of the output image is YUV420 (for MPEG-2), an LPIP (e.g., (S–D)/2D) corresponding to a difference in position between a first luma pixel of the output image and a first luma pixel of the input image may be computed in the horizontal or vertical direction. In addition, a CPIP (e.g., (2S–D)/2D) corresponding to a difference in position between a first chroma pixel of the output image and a first chroma pixel of the input image may be computed in the vertical direction.

Figure 43:
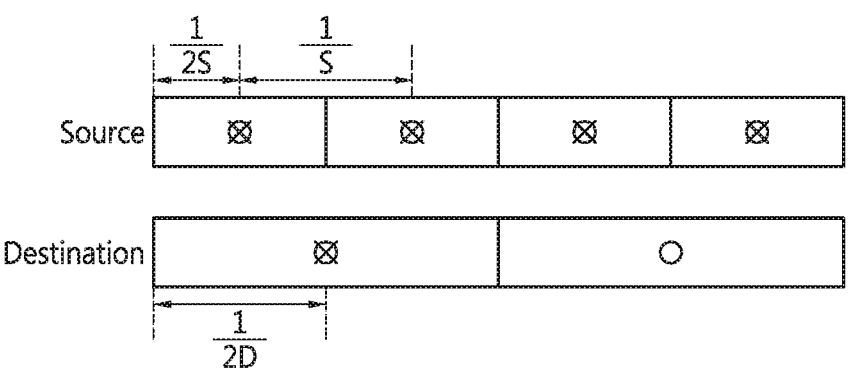

Referring to FIG. 43, when an input image is rotated, the scaling ratio between the input and output images is ½ (e.g., 2:1), the format of the input image is YUV422, and the format of the output image is YUV420 (for MPEG-2), an LPIP (e.g., (S–D)/2D) corresponding to a difference in position between a first luma pixel of the output image and a first luma pixel of the input image may be computed in the horizontal or vertical direction. In addition, a CPIP (e.g., (S–D)/4D) corresponding to a difference in position between a first chroma pixel of the output image and a first chroma pixel of the input image may be computed in the horizontal direction.

Figure 44:
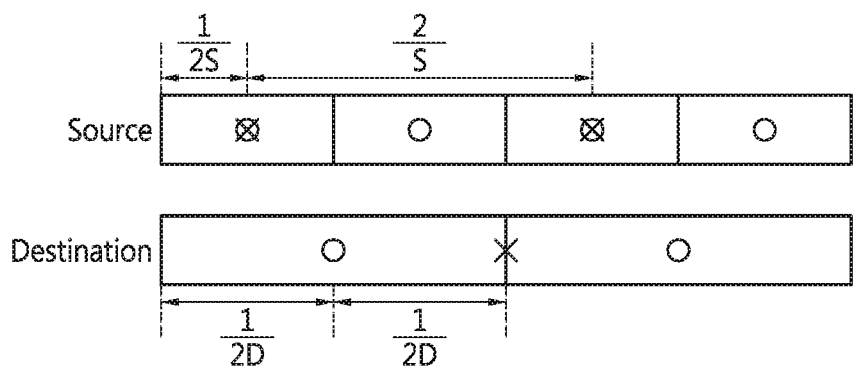

Referring to FIG. 44, when an input image is rotated, the scaling ratio between the input and output images is ½ (e.g., 2:1), the format of the input image is YUV422, and the format of the output image is YUV420 (for MPEG-2), an LPIP (e.g., (S–D)/2D) corresponding to a difference in position between a first luma pixel of the output image and a first luma pixel of the input image may be computed in the horizontal or vertical direction. In addition, a CPIP (e.g., (2S–D)/4D) corresponding to a difference in position between a first chroma pixel of the output image and a first chroma pixel of the input image may be computed in the vertical direction.

FIGS. 45 through 52 are diagrams for explaining methods of computing an initial phase based on whether an input image is rotated, when the format of the input image is YUV420 (for H.263) according to an exemplary embodiment of the present inventive concept.

Figure 45:
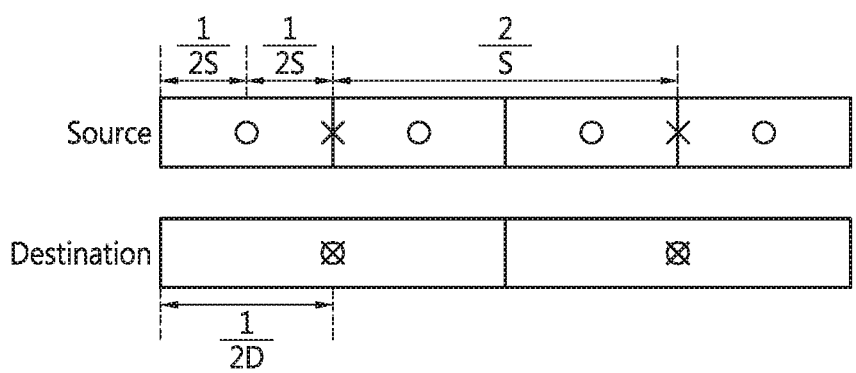
FIGS. 45 through 52 are diagrams for explaining methods of computing an initial phase based on whether an input image is rotated, when the format of the input image is YUV420 (for H.263) according to an exemplary embodiment of the present inventive concept.

Referring to FIG. 45, whether an input image is rotated or not, and when the scaling ratio between the input and output images is ½ (e.g., 2:1), the format of the input image is YUV420 (for H.263), and the format of the output image is YUV444, an LPIP (e.g., (S–D)/2D) corresponding to a difference in position between a first luma pixel of the output image and a first luma pixel of the input image may be computed in the horizontal or vertical direction. In addition, a CPIP (e.g., (S–2D)/4D) corresponding to a difference in position between a first chroma pixel of the output image and a first chroma pixel of the input image may be computed in the horizontal or vertical direction.

Figure 46:
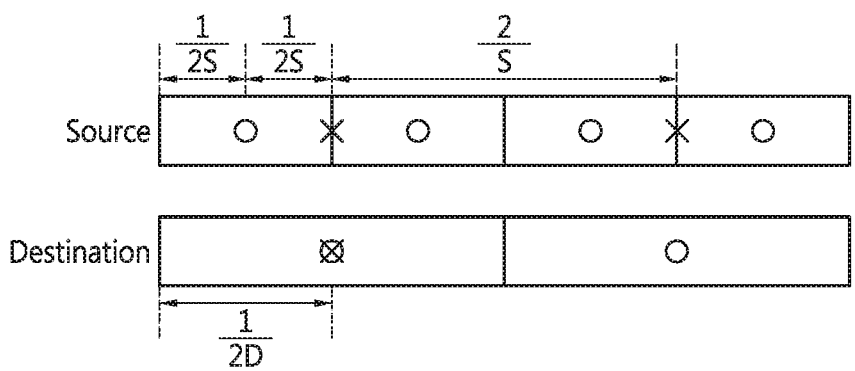

Referring to FIG. 46, when an input image is not rotated, the scaling ratio between the input and output images is ½ (e.g., 2:1), the format of the input image is YUV420 (for H.263), and the format of the output image is YUV422, an LPIP (e.g., (S–D)/2D) corresponding to a difference in position between a first luma pixel of the output image and a first luma pixel of the input image may be computed in the horizontal or vertical direction. In addition, a CPIP (e.g., (S–2D)/4D) corresponding to a difference in position between a first chroma pixel of the output image and a first chroma pixel of the input image may be computed in the horizontal or vertical direction.

Figure 47:
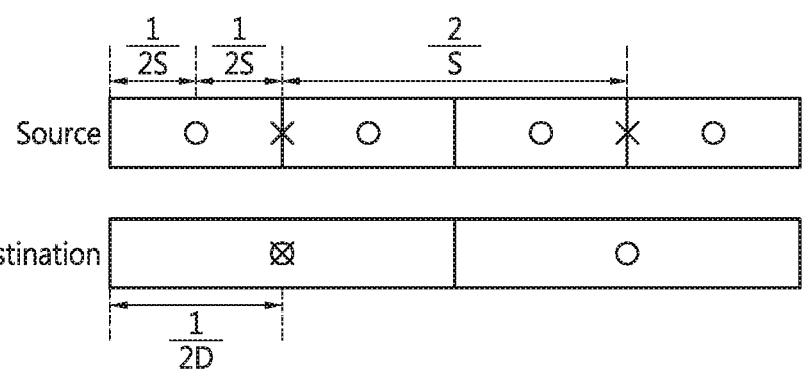

Referring to FIG. 47, when an input image is rotated, the scaling ratio between the input and output images is ½ (e.g., 2:1), the format of the input image is YUV420 (for H.263), and the format of the output image is YUV422, an LPIP (e.g., (S–D)/2D) corresponding to a difference in position between a first luma pixel of the output image and a first luma pixel of the input image may be computed in the horizontal or vertical direction. In addition, a CPIP (e.g., (S–2D)/4D) corresponding to a difference in position between a first chroma pixel of the output image and a first chroma pixel of the input image may be computed in the horizontal or vertical direction.

Figure 48:
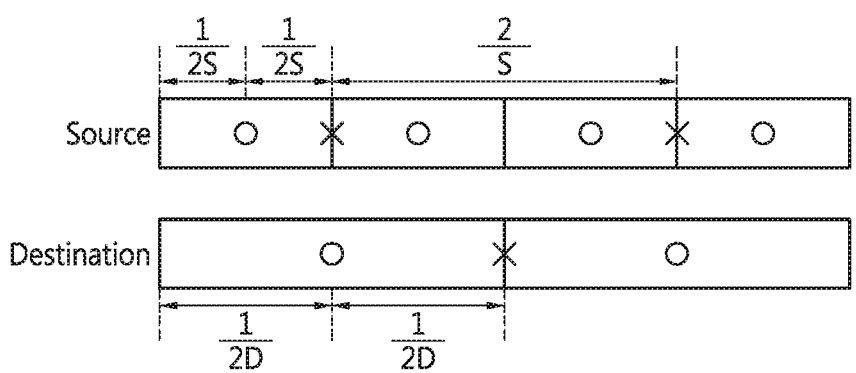

Referring to FIG. 48, whether an input image is rotated or not, and when the scaling ratio between the input and output images is ½ (e.g., 2:1), the format of the input image is YUV420 (for H.263), and the format of the output image is YUV420 (for H.263), an LPIP (e.g., (S–D)/2D) corresponding to a difference in position between a first luma pixel of the output image and a first luma pixel of the input image may be computed in the horizontal or vertical direction. In addition, a CPIP (e.g., (S–D)/2D) corresponding to a difference in position between a first chroma pixel of the output image and a first chroma pixel of the input image may be computed in the horizontal or vertical direction.

Figure 49:
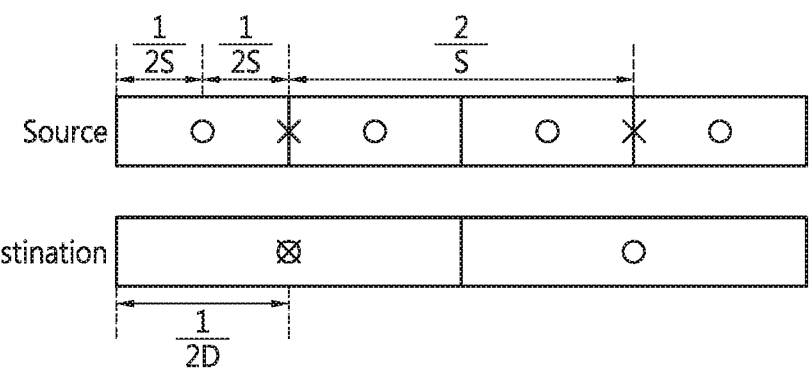

Referring to FIG. 49, when an input image is not rotated, the scaling ratio between the input and output images is ½ (e.g., 2:1), the format of the input image is YUV420 (for H.263), and the format of the output image is YUV420 (for MPEG-2), an LPIP (e.g., (S–D)/2D) corresponding to a difference in position between a first luma pixel of the output image and a first luma pixel of the input image may be computed in the horizontal or vertical direction. In addition, a CPIP (e.g., (S–2D)/4D) corresponding to a difference in position between a first chroma pixel of the output image and a first chroma pixel of the input image may be computed in the horizontal direction.

Figure 50:
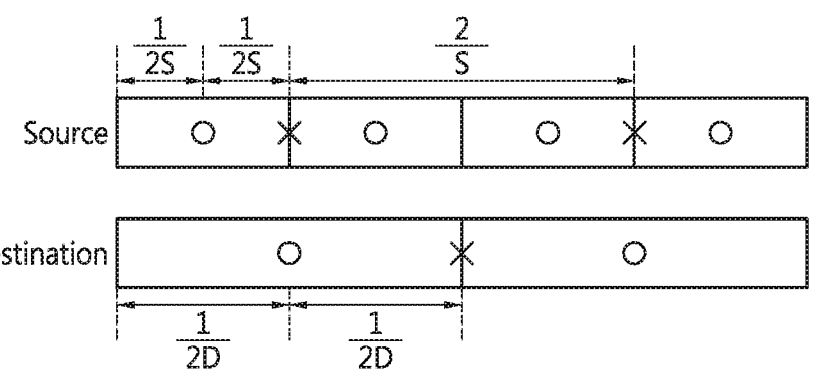

Referring to FIG. 50, when an input image is not rotated, the scaling ratio between the input and output images is ½ (e.g., 2:1), the format of the input image is YUV420 (for H.263), and the format of the output image is YUV420 (for MPEG-2), an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/2D) corresponding to a difference in position between a first chroma pixel of the output image and a first chroma pixel of the input image may be computed in the vertical direction.

Figure 51:
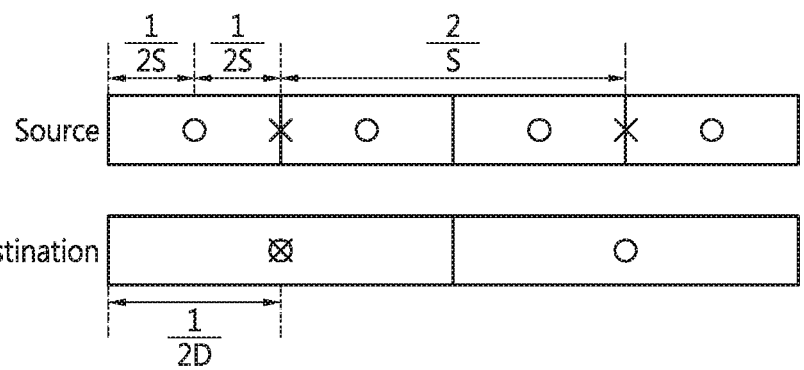

Referring to FIG. 51, when an input image is rotated, the scaling ratio between the input and output images is ½ (e.g., 2:1), the format of the input image is YUV420 (for H.263), and the format of the output image is YUV420 (for MPEG-2), an LPIP (e.g., (S−D)/2D) corresponding to a difference in position between a first luma pixel of the output image and a first luma pixel of the input image may be computed in the horizontal or vertical direction. In addition, a CPIP (e.g., (S−2D)/4D) corresponding to a difference in position between a first chroma pixel of the output image and a first chroma pixel of the input image may be computed in the horizontal direction.

Figure 52:
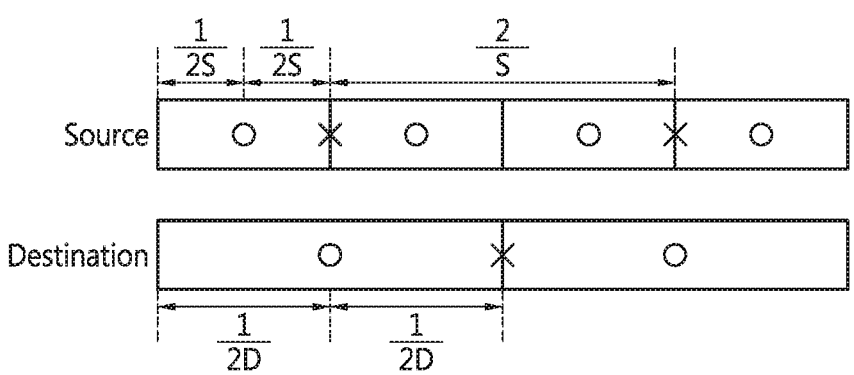

Referring to FIG. 52, when an input image is rotated, the scaling ratio between the input and output images is ½ (e.g., 2:1), the format of the input image is YUV420 (for H.263), and the format of the output image is YUV420 (for MPEG-2), an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/2D) corresponding to a difference in position between a first chroma pixel of the output image and a first chroma pixel of the input image may be computed in the vertical direction.

FIGS. 53 through 68 are diagrams for explaining methods of computing an initial phase based on a rotation angle when the format of an input image is YUV420 (for MPEG-2) according to an exemplary embodiment of the present inventive concept.

Figure 53:
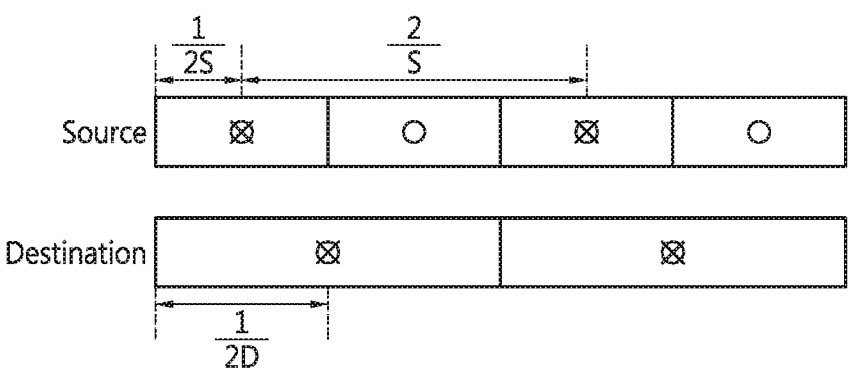
FIGS. 53 through 68 are diagrams for explaining methods of computing an initial phase based on whether an input image is rotated, when the format of the input image is YUV420 (for MPEG-2) according to an exemplary embodiment of the present inventive concept.

Referring to FIG. 53, when there is no rotation, the scaling ratio between the input and output images is ½ (e.g., 2:1), the format of the input image is YUV420 (for MPEG-2), and the format of the output image is YUV444, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the horizontal direction.

Figure 54:
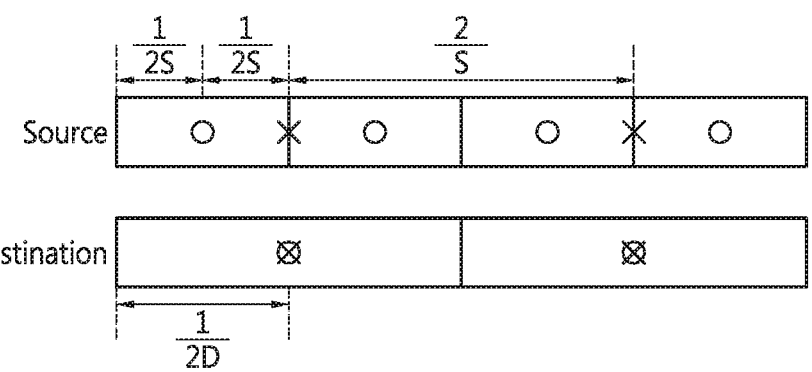

Referring to FIG. 54, when an input image is not rotated, the scaling ratio between the input and output images is ½ (e.g., 2:1), the format of the input image is YUV420 (for MPEG-2), and the format of the output image is YUV444, an LPIP (e.g., (S−D)/2D) corresponding to a difference in position between a first luma pixel of the output image and a first luma pixel of the input image may be computed in the horizontal or vertical direction. In addition, a CPIP (e.g., (S−2D)/4D) corresponding to a difference in position between a first chroma pixel of the output image and a first chroma pixel of the input image may be computed in the vertical direction.

Figure 55:
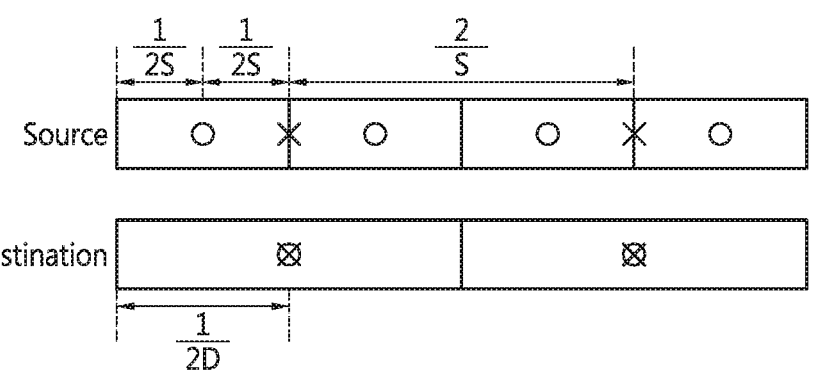

Referring to FIG. 55, when an input image is rotated, the scaling ratio between the input and output images is ½ (e.g., 2:1), the format of the input image is YUV420 (for MPEG-2), and the format of the output image is YUV444, an LPIP (e.g., (S−D)/2D) corresponding to a difference in position between a first luma pixel of the output image and a first luma pixel of the input image may be computed in the horizontal or vertical direction. In addition, a CPIP (e.g., (S−2D)/4D) corresponding to a difference in position between a first chroma pixel of the output image and a first chroma pixel of the input image may be computed in the horizontal direction.

Figure 56:
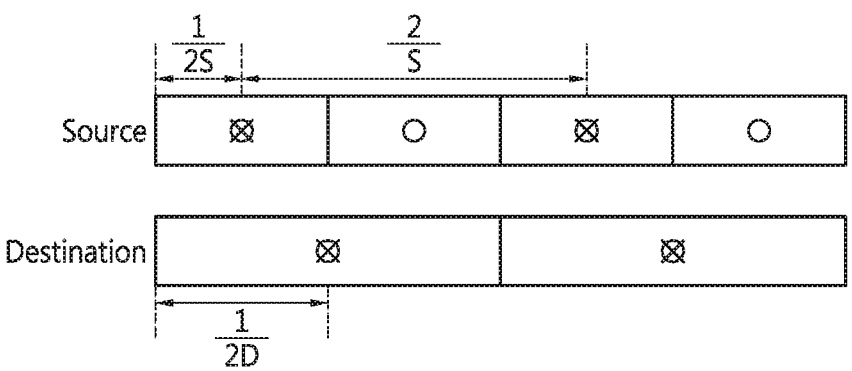

Referring to FIG. 56, when an input image is rotated, the scaling ratio between the input and output images is ½ (e.g., 2:1), the format of the input image is YUV420 (for MPEG-2), and the format of the output image is YUV444, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the vertical direction.

Figure 57:
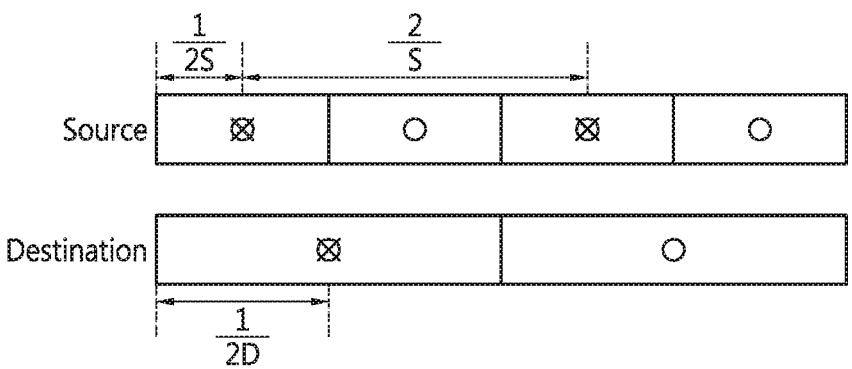

Referring to FIG. 57, when an input image is not rotated, the scaling ratio between the input and output images is ½ (e.g., 2:1), the format of the input image is YUV420 (for MPEG-2), and the format of the output image is YUV422, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the horizontal direction.

Figure 58:
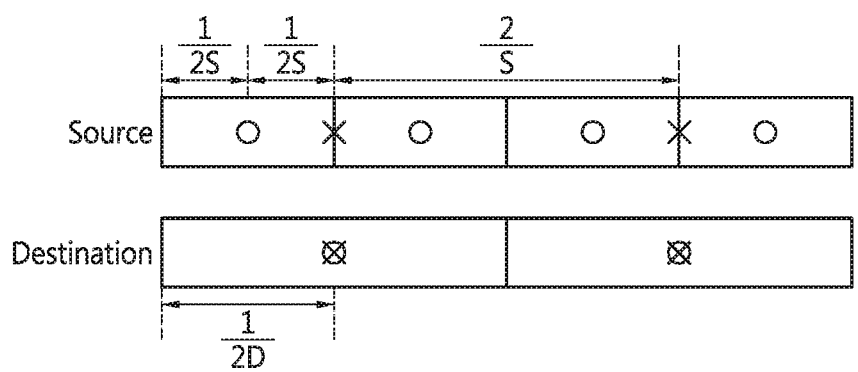

Referring to FIG. 58, when an input image is not rotated, the scaling ratio between the input and output images is ½ (e.g., 2:1), the format of the input image is YUV420 (for MPEG-2), and the format of the output image is YUV422, an LPIP (e.g., (S−D)/2D) corresponding to a difference in position between a first luma pixel of the output image and a first luma pixel of the input image may be computed in the horizontal or vertical direction. In addition, a CPIP (e.g., (S−2D)/4D) corresponding to a difference in position between a first chroma pixel of the output image and a first chroma pixel of the input image may be computed in the vertical direction.

Figure 59:
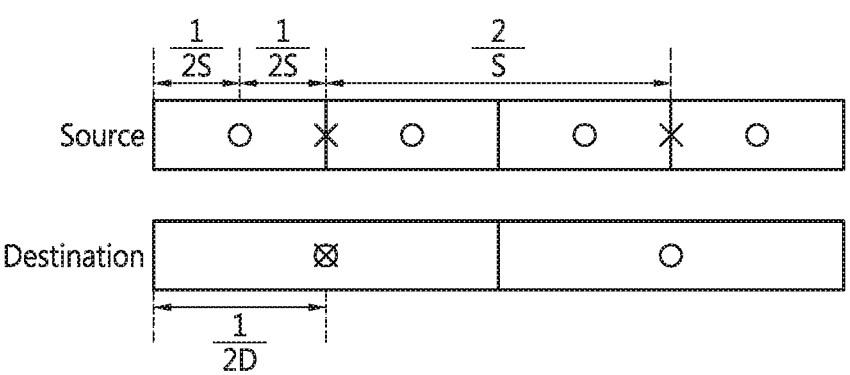

Referring to FIG. 59, when an input image is rotated, the scaling ratio between the input and output images is ½ (e.g., 2:1), the format of the input image is YUV420 (for MPEG-2), and the format of the output image is YUV422, an LPIP (e.g., (S−D)/2D) corresponding to a difference in position between a first luma pixel of the output image and a first luma pixel of the input image may be computed in the horizontal or vertical direction. In addition, a CPIP (e.g., (S−2D)/4D) corresponding to a difference in position between a first chroma pixel of the output image and a first chroma pixel of the input image may be computed in the horizontal direction.

Figure 60:
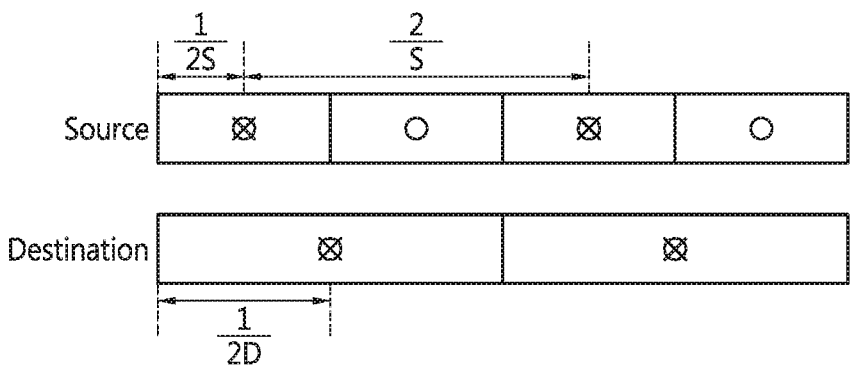

Referring to FIG. 60, when an input image is rotated, the scaling ratio between the input and output images is ½ (e.g., 2:1), the format of the input image is YUV420 (for MPEG-2), and the format of the output image is YUV422, an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the vertical direction.

Figure 61:
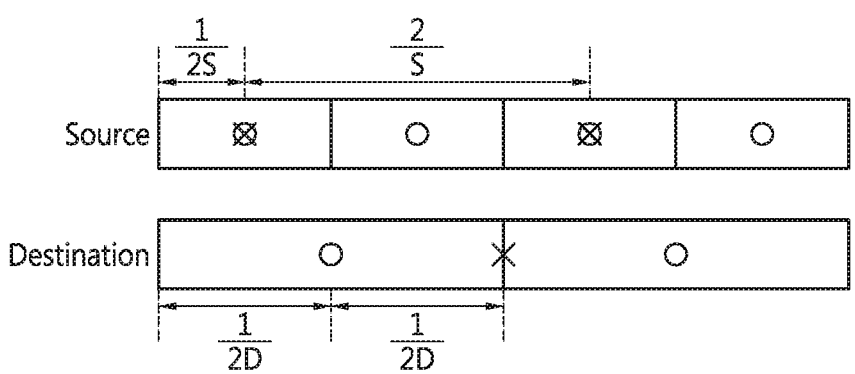

Referring to FIG. 61, when an input image is not rotated, the scaling ratio between the input and output images is ½ (e.g., 2:1), the format of the input image is YUV420 (for MPEG-2), and the format of the output image is YUV420 (for H.263), an LPIP (e.g., (S−D)/2D) corresponding to a difference in position between a first luma pixel of the output image and a first luma pixel of the input image may be computed in the horizontal or vertical direction. In addition, a CPIP (e.g., (2S−D)/4D) corresponding to a difference in position between a first chroma pixel of the output image and a first chroma pixel of the input image may be computed in the horizontal direction.

Figure 62:
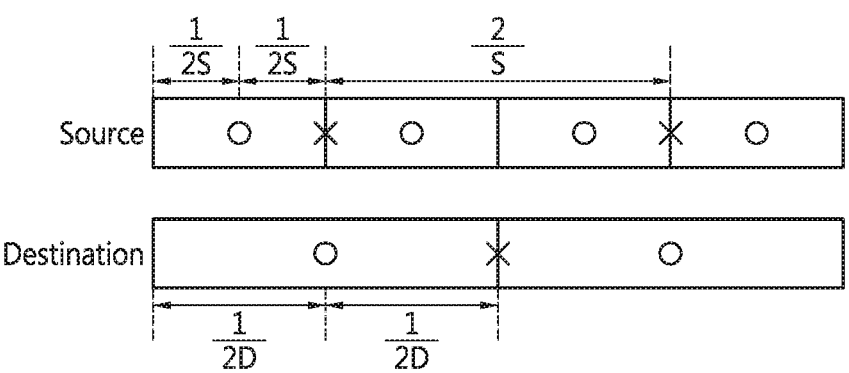

Referring to FIG. 62, when an input image is not rotated, the scaling ratio between the input and output images is ½ (e.g., 2:1), the format of the input image is YUV420 (for MPEG-2), and the format of the output image is YUV420 (for H.263), an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/2D) corresponding to a difference in position between a first chroma pixel of the output image and a first chroma pixel of the input image may be computed in the vertical direction.

Figure 63:
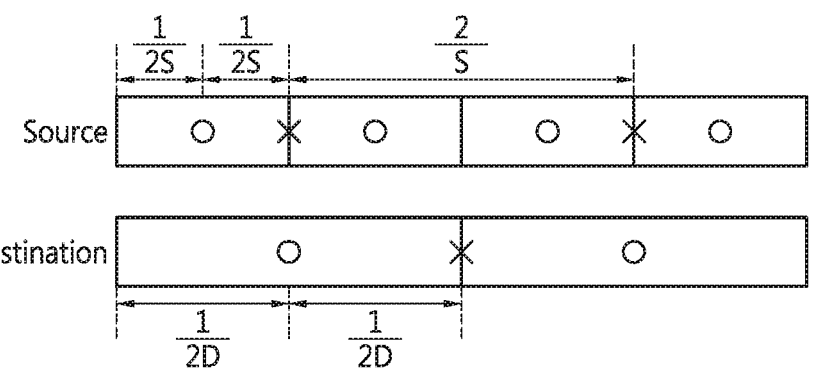

Referring to FIG. 63, when an input image is rotated, the scaling ratio between the input and output images is ½ (e.g., 2:1), the format of the input image is YUV420 (for MPEG-2), and the format of the output image is YUV420 (for H.263), an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the horizontal direction.

Figure 64:
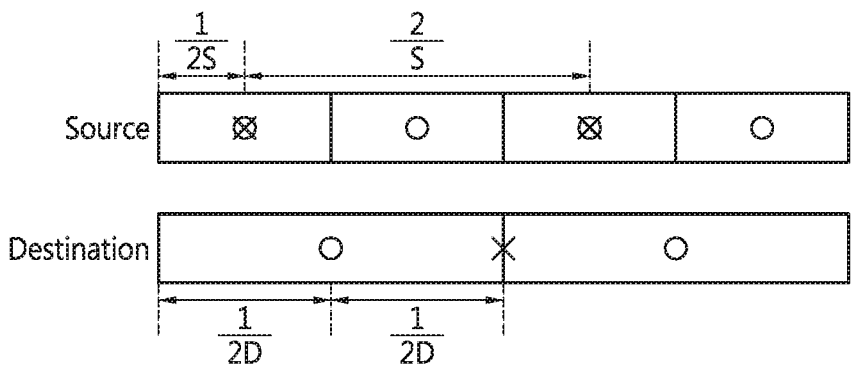

Referring to FIG. 64, when an input image is rotated, the scaling ratio between the input and output images is ½ (e.g., 2:1), the format of the input image is YUV420 (for MPEG-2), and the format of the output image is YUV420 (for H.263), an LPIP (e.g., (S−D)/2D) corresponding to a difference in position between a first luma pixel of the output image and a first luma pixel of the input image may be computed in the horizontal or vertical direction. In addition, a CPIP (e.g., (2S−D)/4D) corresponding to a difference in position between a first chroma pixel of the output image and a first chroma pixel of the input image may be computed in the vertical direction.

Figure 65:
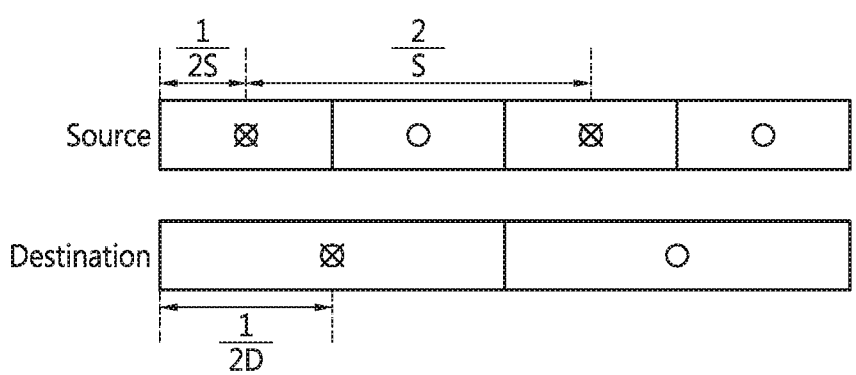

Referring to FIG. 65, when an input image is not rotated, the scaling ratio between the input and output images is ½ (e.g., 2:1), the format of the input image is YUV420 (for MPEG-2), and the format of the output image is YUV420 (for MPEG-2), an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/4D) corresponding to a difference in position between a first chroma pixel of the output image and a first chroma pixel of the input image may be computed in the horizontal direction.

Figure 66:
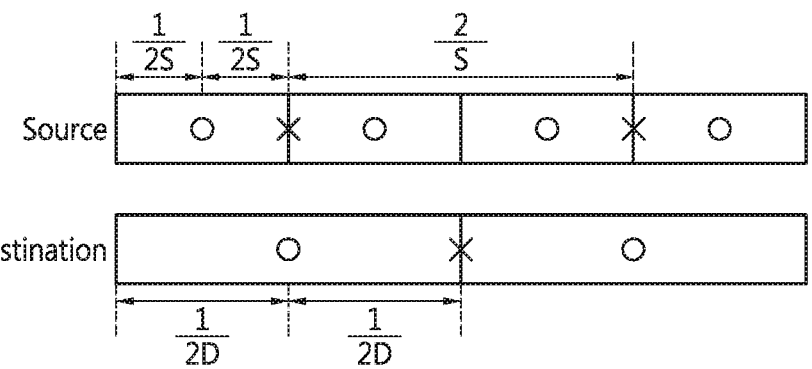

Referring to FIG. 66, when an input image is not rotated, the scaling ratio between the input and output images is ½ (e.g., 2:1), the format of the input image is YUV420 (for MPEG-2), and the format of the output image is YUV420 (for MPEG-2), an LPIP (e.g., (S−D)/2D) corresponding to a difference in position between a first luma pixel of the output image and a first luma pixel of the input image may be computed in the horizontal or vertical direction. In addition, a CPIP (e.g., (S−D)/2D) corresponding to a difference in position between a first chroma pixel of the output image and a first chroma pixel of the input image may be computed in the vertical direction.

Figure 67:
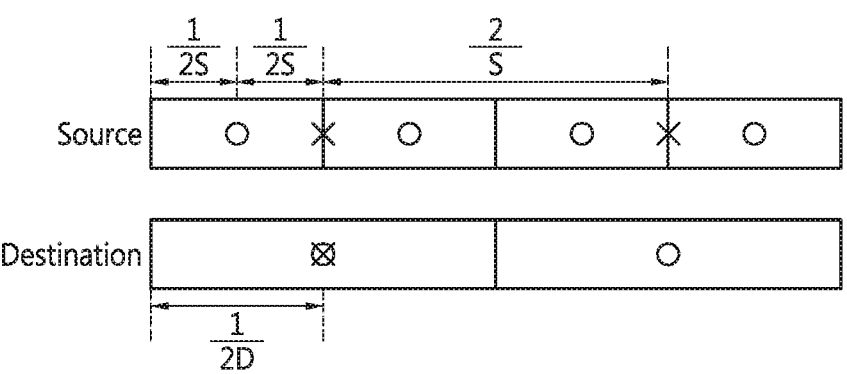

Referring to FIG. 67, when an input image is rotated, the scaling ratio between the input and output images is ½ (e.g., 2:1), the format of the input image is YUV420 (for MPEG-2), and the format of the output image is YUV420 (for MPEG-2), an LPIP (e.g., (S−D)/2D) corresponding to a difference in position between a first luma pixel of the output image and a first luma pixel of the input image may be computed in the horizontal or vertical direction. In addition, a CPIP (e.g., (S−2D)/4D) corresponding to a difference in position between a first chroma pixel of the output image and a first chroma pixel of the input image may be computed in the horizontal direction.

Figure 68:
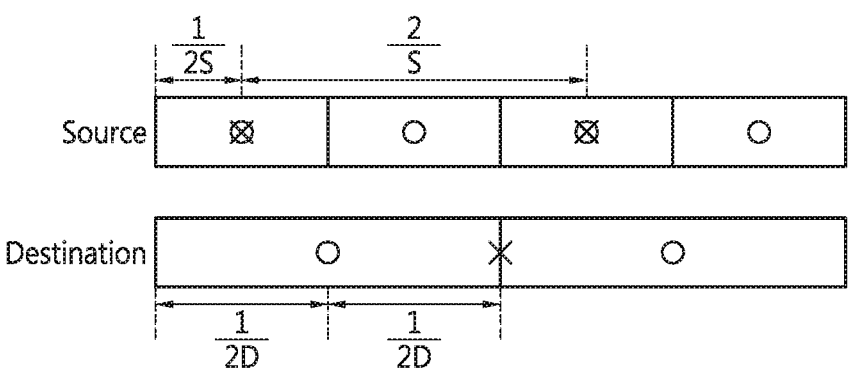

Referring to FIG. 68, when an input image is rotated, the scaling ratio between the input and output images is ½ (e.g., 2:1), the format of the input image is YUV420 (for MPEG-2), and the format of the output image is YUV420 (for MPEG-2), an LPIP (e.g., (S−D)/2D) corresponding to a difference in position between a first luma pixel of the output image and a first luma pixel of the input image may be computed in the horizontal or vertical direction. In addition, a CPIP (e.g., (2S−D)/4D) corresponding to a difference in position between a first chroma pixel of the output image and a first chroma pixel of the input image may be computed when an interval between adjacent chroma pixels of the input image and an interval between adjacent chroma pixels of the output image are normalized to 2/S in the vertical direction.

Figure 69:
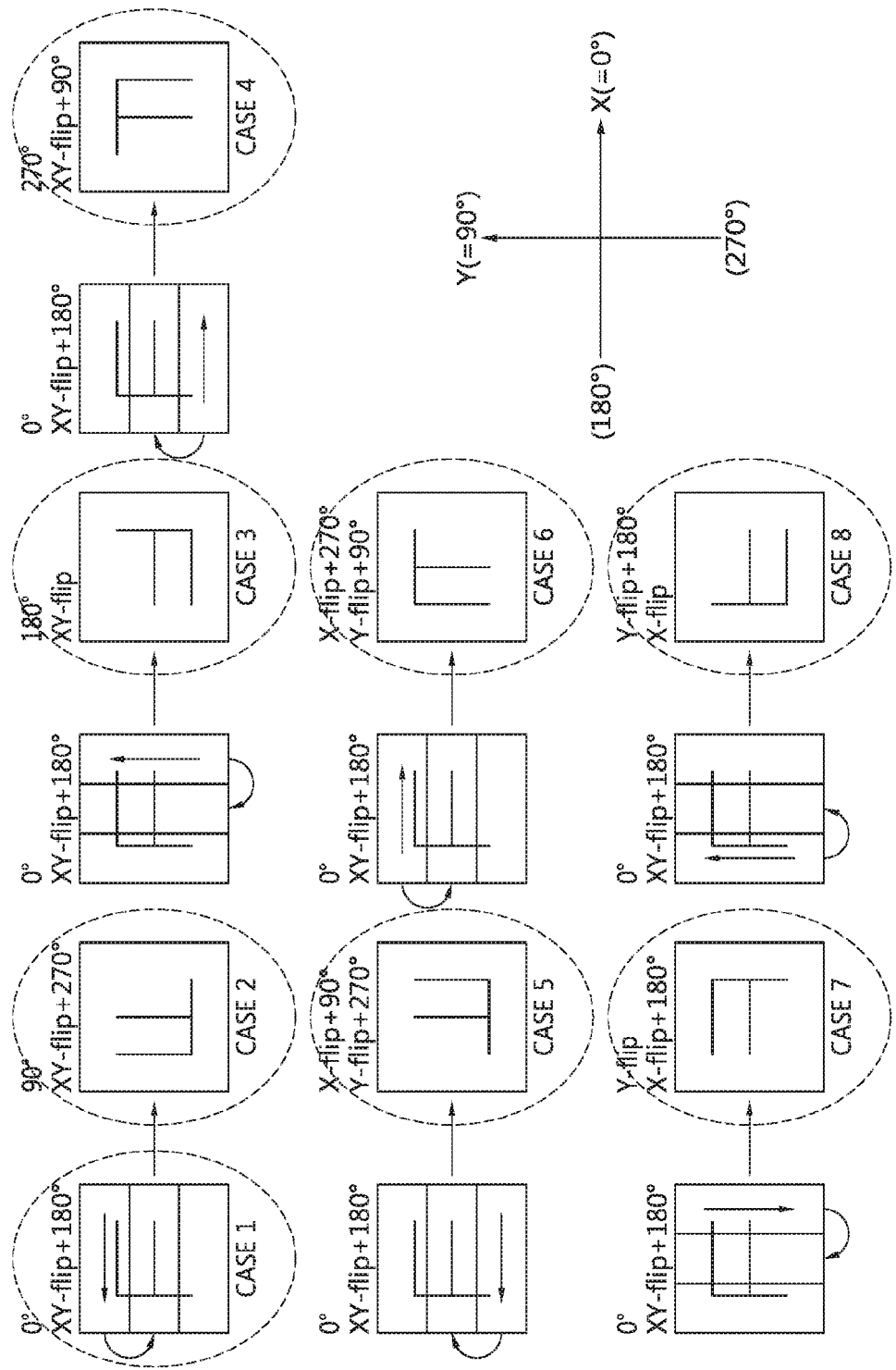
FIG. 69 is a diagram showing rotation angles and flip directions applied to an input image according to an exemplary embodiment of the present inventive concept.

FIG. 69 is a diagram showing rotation angles and flip directions applied to an input image according to an exemplary embodiment of the present inventive concept. Referring to FIGS. 1A through 69, for example, when an input image is scaled up or down, the format of the input image is YUV422, the format of the output image is YUV444 or YUV422, and a rotation mode is a second case CASE2, initial phases are determined to be YH=(SH−DW)/2DW, YV=(SW−DH)/2DH, CH=(SH−DW)/2DW, and CV=(SW−DH)/4DH−0.5.

For example, when an input image is scaled up or down, the format of the input image is YUV422, the format of the output image is YUV444 or YUV422, and the rotation mode is a first case CASE1, the initial phases are determined to be YH=(SW−DW)/2DW, YV=(SH−DH)/2DH, CH=(SW−DW)/4DW, and CV=(SH−DH)/2DH.

For example, when an input image is scaled up or down, the format of the input image is YUV422, the format of the output image is YUV444 or YUV422, and the rotation mode is a third case CASE3, the initial phases are determined to be YH=(SW−DW)/2DW, YV=(SH−DH)/2DH, CH=(SW−DW)/4DW−0.5, and CV=(SH−DH)/2DH.

For example, when an input image is scaled up or down, the format of the input image is YUV422, the format of the output image is YUV444 or YUV422, and the rotation mode is a fourth case CASE4, the initial phases are determined to be YH=(SH−DW)/2DW, YV=(SW−DH)/2DH, CH=(SH−DW)/2DW, and CV=(SW−DH)/4DH.

For example, when an input image is scaled up or down, the format of the input image is YUV422, the format of the output image is YUV444 or YUV422, and the rotation mode is a fifth case CASE5, the initial phases are determined to be YH=(SW−DW)/2DW, YV=(SH−DH)/2DH, CH=(SH−DW)/2DW, and CV=(SW−DH)/4DH−0.5.

For example, when an input image is scaled up or down, the format of the input image is YUV422, the format of the output image is YUV444 or YUV422, and the rotation mode is a sixth case CASE6, the initial phases are determined to be YH=(SH−DW)/2DW, YV=(SW−DH)/2DH, CH=(SH−DW)/2DW, and CV=(SW−DH)/4DH.

For example, when an input image is scaled up or down, the format of the input image is YUV422, the format of the output image is YUV444 or YUV422, and the rotation mode is a seventh case CASE7, the initial phases are determined to be YH=(SW−DW)/2DW, YV=(SH−DH)/2DH, CH=(SW−DW)/4DW−0.5, and CV=(SH−DH)/2DH.

For example, when an input image is scaled up or down, the format of the input image is YUV422, the format of the output image is YUV444 or YUV422, and the rotation mode is an eighth case CASE8, the initial phases are determined to be YH=(SH−DW)/2DW, YV=(SW−DH)/2DH, CH=(SW−DW)/4DW, and CV=(SH−DH)/2DH.

Here, YH denotes an LPIP in the horizontal direction, YV denotes an LPIP in the vertical direction, CH denotes a CPIP in the horizontal direction, CV denotes a CPIP in the vertical direction, SH denotes a height of the input image, DW denotes a width of an output image, SW denotes a width of the input image, and DH denotes a height of the output image.

As described above, according to an exemplary embodiment of the present inventive concept, an image processing device computes an initial phase corresponding to a difference between a position of a first pixel of an output image and a position of a first pixel of an input image, and determines the position of the first pixel of the output image based on the initial phase and the position of the first pixel of the input image.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. An image processing method using an image processing device, the method comprising:
   computing an initial phase corresponding to a difference between a position of a first pixel of an input image and a position of a first pixel of an output image using at least one of scaling ratio information between the input and output images, chroma subsampling format conversion information applied between the input and output images, or rotation angle information of the input image;
   correcting the position of the first pixel of the output image by shifting the position of the first pixel of the output image by a direction and a distance that are based on the initial phase and the position of the first pixel of the input image; and
   outputting the corrected output image for display.

2. The image processing method of claim 1, further comprising generating pixels of the output image based on the position of the first pixel of the output image and pixels of the input image.

3. The image processing method of claim 1, wherein the computing the initial phase comprises:
   computing an initial phase of a first luma sample of the output image using the scaling ratio information; and
   computing an initial phase of a first chroma sample of the output image using the at least one of the scaling ratio information, the chroma subsampling format conversion information, or the rotation angle information.

4. The image processing method of claim 1, wherein a format of the input image corresponds to YUV444, and a format of the output image corresponds to YUV422 or YUV420.

5. The image processing method of claim 1, wherein a format of the input image corresponds to YUV422 or YUV420, and a format of the output image corresponds to YUV444.

6. The image processing method of claim 1, wherein a format of the input image is one of YUV422 and YUV420, and a format of the output image is another one of YUV422 and YUV420.

7. The image processing method of claim 1, wherein the image processing device is a central processing unit or a multimedia processing circuit included in a system on chip.

8. A system on chip comprising:
   a central processing unit configured to compute an initial phase corresponding to a difference between a position of a first pixel of an input image and a position of a first pixel of an output image using at least one of scaling ratio information between the input and output images, chroma subsampling format conversion information applied between the input and output images, or rotation angle information of the input image; and
   a multimedia processing circuit configured to be connected to the central processing unit, to receive the initial phase and the input image, and to determine the position of the first pixel of the output image based on the initial phase and the position of the first pixel of the input image, wherein the multimedia processing circuit generates pixels of the output image based on the position of the first pixel of the output image and pixels of the input image.

9. The system on chip of claim 8, wherein the central processing unit computes an initial phase of a first luma sample of the output image using the scaling ratio information.

10. The system on chip of claim 8, wherein the central processing unit computes an initial phase of a first chroma sample of the output image using the at least one of the scaling ratio information, the chroma subsampling format conversion information, or the rotation angle information.

11. The system on chip of claim 8, wherein the multimedia processing circuit comprises a scaler configured to scale up or down the input image based on the scaling ratio information to generate the scaled up or down input image as the output image.

12. The system on chip of claim 8, wherein the multimedia processing circuit comprises a chroma subsampling converter configured to convert a format of the input image based on the chroma subsampling format conversion information and generate the output image in a converted format.

13. The system on chip of claim 8, wherein the multimedia processing circuit comprises a rotator configured to rotate the input image based on the rotation angle information to generate the rotated input image as the output image.

14. An image processing device comprising at least one of:
   a rotator rotating an input image input to the image processing device based on rotation angle information;

a scaler scaling up or down the input image based on scaling ratio information; and a chroma subsampling converter converting a first format of the input image to a second format based on chroma subsampling format conversion information, wherein the image processing device computes an initial phase corresponding to a difference between a position of a first pixel of the input image and a position of a first pixel of an output image output from the image processing device based on at least one of the rotation angle information, the scaling ratio information, or the chroma subsampling format conversion information, wherein the image processing device further includes a pixel shifter correcting the position of the first pixel of the output image by shifting the position of the first pixel of the output image by a direction and a distance that are based on the initial phase and the position of the first pixel of the input image.

15. The image processing device of claim 14, wherein the image processing device generates pixels of the output image based on the position of the first pixel of the output image and pixels of the input image.

16. The image processing device of claim 14, wherein the image processing device computes an initial phase of a first luma sample of the output image using the scaling ratio information.

17. The image processing device of claim 14, wherein the image processing device computes an initial phase of a first chroma sample of the output image using the at least one of the scaling ratio information, the chroma subsampling format conversion information, or the rotation angle information.

* * * * *